US011271796B2

(12) United States Patent
Tapia et al.

(10) Patent No.: US 11,271,796 B2
(45) Date of Patent: *Mar. 8, 2022

(54) AUTOMATIC CUSTOMER COMPLAINT RESOLUTION

(71) Applicant: TUPL INC., Bellevue, WA (US)

(72) Inventors: Pablo Tapia, Snoqualmie, WA (US); Rafael Sanchez-Mejias, Snoqualmie, WA (US)

(73) Assignee: TUPL INC., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,993

(22) Filed: Jun. 8, 2020

(65) Prior Publication Data
US 2020/0304364 A1 Sep. 24, 2020

Related U.S. Application Data

(63) Continuation-in-part of application No. 16/112,541, filed on Aug. 24, 2018, now Pat. No. 10,680,875, (Continued)

(51) Int. Cl.
*H04L 12/24* (2006.01)
*H04L 41/0631* (2022.01)
(Continued)

(52) U.S. Cl.
CPC ......... *H04L 41/0631* (2013.01); *G06N 7/005* (2013.01); *G06N 20/00* (2019.01);
(Continued)

(58) Field of Classification Search
CPC . H04L 41/0631; H04L 41/16; H04L 41/5067; H04L 41/5074; G06N 20/00; G06N 7/005; H04W 24/08; H04W 24/10
See application file for complete search history.

(56) References Cited

U.S. PATENT DOCUMENTS 9,122,602 B1 * 9/2015 Jewell ................... G06F 11/079
9,229,800 B2 * 1/2016 Jain ........................ G06N 5/022
(Continued)

OTHER PUBLICATIONS

Final Office Action dated Mar. 8, 2018 in U.S. Appl. No. 14/800,648, 21 pages.
(Continued)

*Primary Examiner* — Michael J Moore, Jr.

(57) ABSTRACT

An analytic application may automatically determine a root cause of an issue with a wireless carrier network and generate a solution for the root cause. Initially, a data management platform may receive performance data regarding user device and network components of a wireless carrier network from multiple data sources. Subsequently, the analytic application may receive an indication of an issue affecting one or more user devices that are using the wireless carrier network. The analytic application may analyze the performance data using a trained machine learning model to determine a root cause for the issue affecting the one or more user devices. The trained machine learning model may employ multiple types of machine learning algorithms to analyze the performance data. The analytic application may provide the root cause or the solution that resolves the root cause for presentation.

20 Claims, 14 Drawing Sheets

Related U.S. Application Data which is a continuation of application No. 15/212,061, filed on Jul. 15, 2016, now Pat. No. 10,063,406.

(60) Provisional application No. 62/193,002.

(51) Int. Cl.

| | | |
|---|---|---|
| *H04W 24/08* | (2009.01) | |
| *H04L 41/5074* | (2022.01) | |
| *H04L 41/16* | (2022.01) | |
| *G06N 7/00* | (2006.01) | |
| *H04L 41/5067* | (2022.01) | |
| *G06N 20/00* | (2019.01) | |
| *H04W 24/10* | (2009.01) | |

(52) U.S. Cl.
CPC .......... *H04L 41/16* (2013.01); *H04L 41/5067* (2013.01); *H04L 41/5074* (2013.01); *H04W 24/08* (2013.01); *H04W 24/10* (2013.01)

(56) References Cited

U.S. PATENT DOCUMENTS

| | | | |
|---|---|---|---|
| 9,699,049 B2* | 7/2017 | Gupta | H04L 41/142 |
| 9,843,486 B2* | 12/2017 | Feller | H04L 41/5009 |
| 9,853,882 B2* | 12/2017 | Vasseur | H04L 47/50 |
| 10,063,406 B2* | 8/2018 | Tapia | H04W 24/08 |
| 10,680,875 B2* | 6/2020 | Tapia | H04L 41/16 |
| 2001/0019960 A1 | 9/2001 | Takayama et al. | |
| 2007/0076728 A1 | 4/2007 | Rieger et al. | |
| 2009/0063387 A1* | 3/2009 | Beaty | G06N 5/04 706/50 |
| 2011/0136533 A1 | 6/2011 | Senarath et al. | |
| 2012/0066547 A1* | 3/2012 | Gilbert | H04L 41/5074 714/26 |
| 2012/0072267 A1 | 3/2012 | Gutierrez et al. | |
| 2012/0092154 A1 | 4/2012 | Petite | |
| 2013/0083678 A1 | 4/2013 | Yin | |
| 2013/0145024 A1 | 6/2013 | Happia et al. | |
| 2013/0159395 A1 | 6/2013 | Backholm et al. | |
| 2014/0128123 A1 | 5/2014 | Matsunaga | |
| 2014/0370830 A1 | 12/2014 | Steer | |
| 2014/0379619 A1* | 12/2014 | Permeh | G06N 5/02 706/12 |
| 2015/0081890 A1 | 3/2015 | Richards et al. | |
| 2015/0280968 A1* | 10/2015 | Gates | G06F 11/30 714/37 |
| 2015/0280969 A1* | 10/2015 | Gates | G06F 11/30 714/37 |
| 2015/0288557 A1* | 10/2015 | Gates | G06F 11/3082 714/37 |
| 2015/0333994 A1 | 11/2015 | Gell et al. | |
| 2016/0028616 A1* | 1/2016 | Vasseur | H04L 47/50 370/412 |
| 2016/0088006 A1* | 3/2016 | Gupta | H04L 41/16 726/23 |
| 2016/0242053 A1* | 8/2016 | Leontiadis | H04W 24/10 |
| 2016/0277265 A1* | 9/2016 | Paradela | H04L 43/50 |
| 2020/0372415 A1* | 11/2020 | Mann | H04L 41/16 |

OTHER PUBLICATIONS

Non-Final Office Action dated Jul. 27, 2017 in U.S. Appl. No. 14/800,648, 50 pages.

International Search Report and Written Opinion dated Aug. 24, 2016 in International Application No. PCT/US2015/040809, 10 pages.

Youping Zhao et al., "Radio Environment Map Enabled Situation-Aware Cognitive Radio Learning Algorithms," In: Proceedings of Software Defined Radio (SDR) Technical Conference (Nov. 2006), 6 pages.

* cited by examiner

ACCR – Root Cause Analysis

| Overview | Customer Tickets | Node Tickets | Alarms | Network Performance | Call Performance |

DATE 07/07/2016  RANGE 7 days back

Customer Tickets

| Ticket | Timestamp | Site ID | Mobile No. | Status | Category | Resolution | Assignee | Closed by | Complaint | Log |
|---|---|---|---|---|---|---|---|---|---|---|
| 1123 | 10:35 AM | 4A56 | (221)123-1234 | Closed | Voice Services | Coverage Problem Corrected | J. Doe | A. Jones | Dropped Call | Show |

Ticket Details

Service Complaint Dropped Call

Ticket Description Subscriber has been experiencing dropped calls since getting Phone X. Issue is not location specific, drops calls several times a day, issue for over a month.

| Field | Value |
|---|---|
| Assignee Group | D34351 |
| Date | 07/07/2016 |
| Coverage Level | Very Strong |
| Customer Type | Post Paid |
| Device Make | Company A |
| Device Model | Phone X |
| IMEI | 33434672797 |

Resolution Validation

| Current Resolution | Coverage Problem Corrected |
|---|---|
| Suggest Resolution | Mobility |
| Suggested Comment | High HO Failure Ratio SE01641A (top offender) for IF Data No WiFi Call (rid=22) |
| Reliability | High |
| Engineer Validation | Pending |

FIG. 4

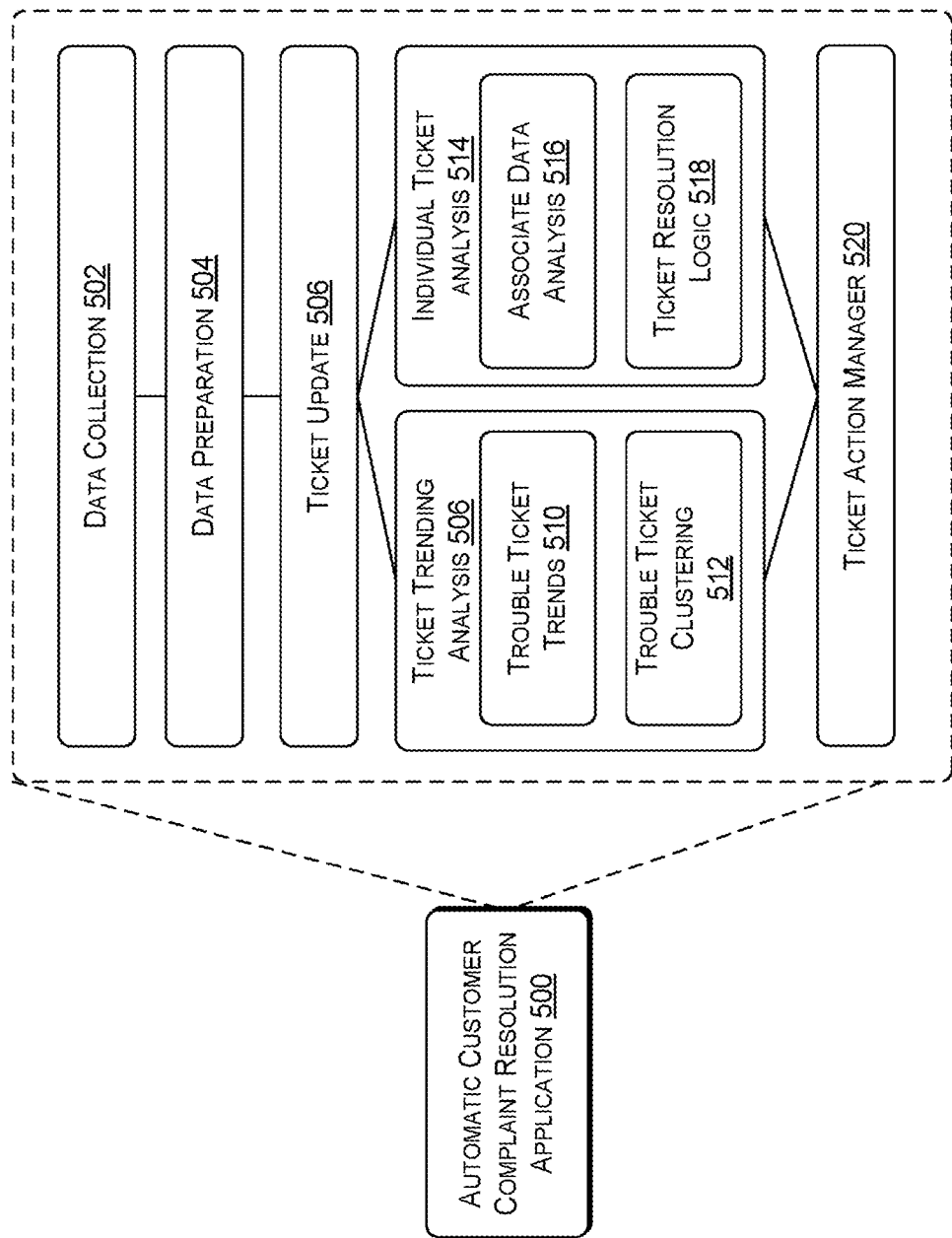

AUTOMATIC CUSTOMER COMPLAINT RESOLUTION

CROSS REFERENCE TO RELATED PATENT APPLICATIONS

This application is a continuation-in-part of U.S. application Ser. No. 16/112,541, filed Aug. 24, 2018, (U.S. patent Ser. No. 10/680,875 issued Jun. 9, 2020) which is a continuation of U.S. application Ser. No. 15/212,061 filed Jul. 15, 2016 (U.S. patent Ser. No. 10/063,406 issued Aug. 28, 2018), which claims priority to U.S. Provisional Patent Application No. 62/193,002, filed on Jul. 15, 2015, entitled "Big Data Machine Learning Use Cases," which are hereby incorporated by reference in their entirety.

BACKGROUND

A wireless telecommunication carrier may face many challenges in finding and troubleshooting wireless communication device and carrier network issues that degrade the quality of service for their subscribers. These issues may lead to customer complaints, subscriber churn, and revenue loss for the wireless telecommunication carriers. While key performance indicators on network performance may provide some insight into the performance of the carrier network, such key performance indicators may not provide a complete picture. For example, such key performance indicators may not provide proper visibility on the real service experience of subscribers. Further, because key performance indicators are often aggregated on a network cell level, they may not provide insight with respect to non-network problems, such as subscriber or handset specific problems. Thus, key performance indicators on network performance generally do not provide an end-to-end view of the performance of all elements involved in a wireless telecommunication chain.

The lack of a comprehensive end-to-end view and proper troubleshooting tools may cause network engineers of the wireless telecommunication carrier to spend too much time performing manual analysis of customer complaints, even though the diagnosis and resolution of many complaints may be automated. For example, network engineers may spend an average of 30 minutes to resolve each subscriber trouble ticket, and the average turn around for the resolution of a subscriber trouble ticket may be as long as two days. Furthermore, as many as a quarter of the subscriber trouble tickets may go unresolved due to the lack of visibility to the underlying root cause at the time the issue actually occurred. The delay and the failure in resolving customer complaints regarding quality of service issues may result in a loss of revenue, customer base, and business reputation for the wireless telecommunication carrier.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 4 is an illustrative user interface of an automatic customer complaint resolution application that provides a root cause and a resolution for a service issue.

FIG. 5 is a block diagram showing a workflow of the automatic customer complaint resolution application that provides a root cause and a resolution for a service issue.

DETAILED DESCRIPTION

Figure 1:
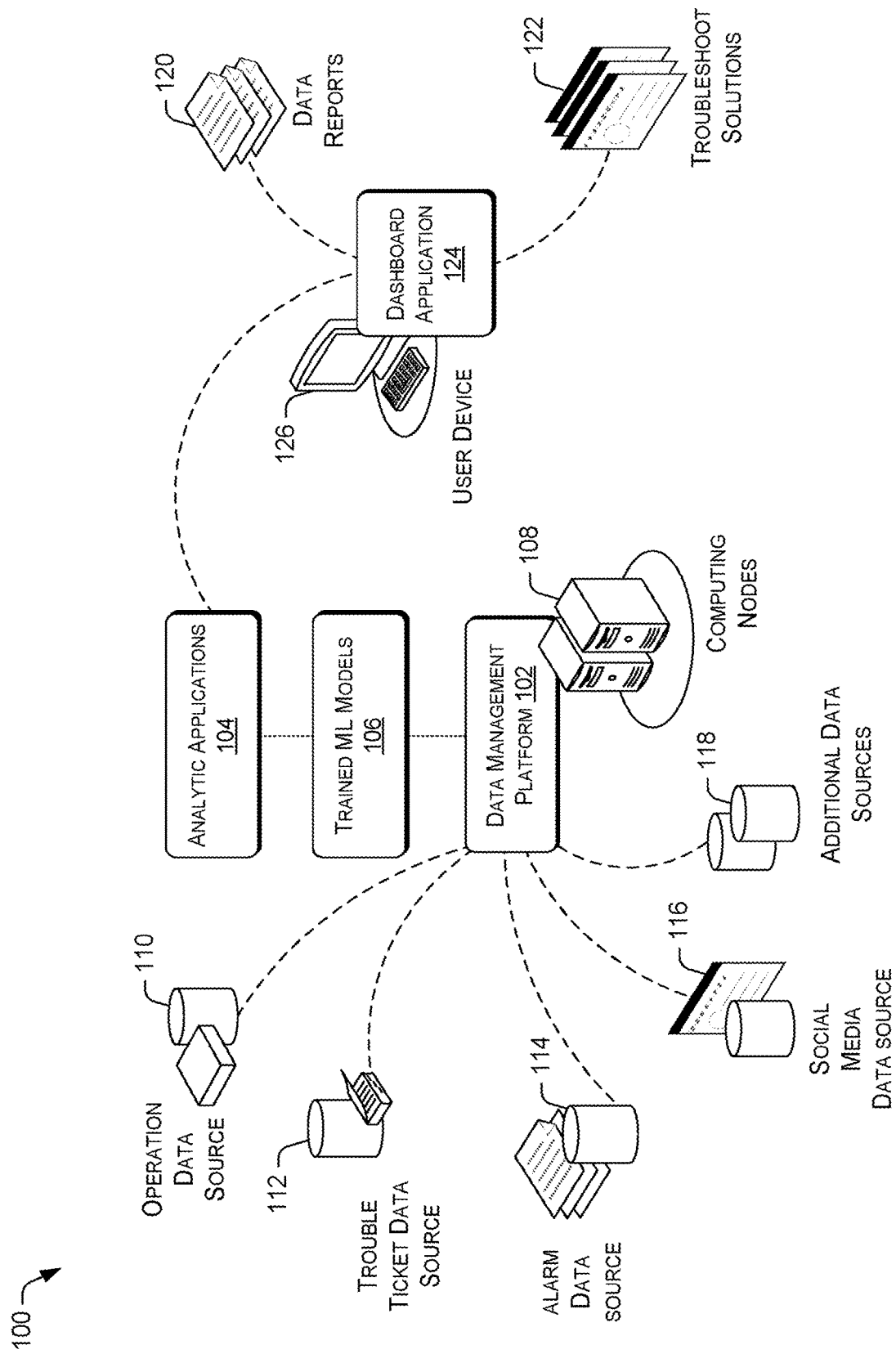
FIG. 1 illustrates an example architecture for performing comprehensive device and network data analysis of a wireless carrier network to resolve quality of service issues.

This disclosure is directed to techniques for using a data management platform in conjunction with analytic applications to perform comprehensive analysis of user device performance data and network performance data of a wireless carrier network to resolve quality of service issues for subscribers of the network. The user device performance data and the network performance data may be obtained from multiple data sources. In various embodiments, the multiple data sources may provide RAN Operation Support System (OSS) counters, Call Detail Records (CDRs), VoLTE call traces, Session Initiation Protocol (SIP) trace data, Real-Time Transport Protocol (RTP) Control Protocol (RTCP) trace data, alarm data, alert data, trouble ticket data, social media data, operation data, key performance indicator (KPI) data, device performance data, as well as other data that are related to the operations of the wireless carrier network. Accordingly, the analytic applications may aggregate or converge the multiple sources of data to perform real time or non-real time comprehensive analysis that generates insight into the root causes of quality of service issues. The insight into the root causes of the quality of service issues may be further leveraged by the analytic applications to generate solutions for resolving the quality of service issues.

For example, an analytic application may perform resource-aware subscriber monitoring to determine whether excessive data usage by subscribers truly impacts the performance of the network at a particular geolocation. Based on such a determination, the analytic application may make a recommendation as to whether a capacity upgrade is to be implemented at the particular geolocation. In another example, an analytic application may generate an end-to-end look at the performance of device components of a user device and network components of the wireless carrier network in order to resolve a quality of service issue for a subscriber. In further embodiments, an automatic customer complaint resolution application may leverage a trained machine learning model to analyze the user device performance data and the network performance data to determine root causes for quality of service issues for subscribers.

The comprehensive analysis of user device performance data and network performance data of a wireless carrier network on a granular level may enable the discovery of root causes of quality of service issues that are invisible to conventional data analysis techniques. Accordingly, such analysis may pinpoint the root cause of a quality of service issue to a specific device or network component. Further, the use of a machine learning model during the analysis may enable the automatic resolution of customer complaints. Such automatic resolution may reduce issue resolution time while increase issue resolution rate. The techniques described herein may be implemented in a number of ways. Example implementations are provided below with reference to the following FIGS. 1-14.

Example Architecture

FIG. 1 illustrates an example architecture for performing comprehensive device and network data analysis of a wireless carrier network to resolve quality of service issues. The architecture 100 may include a data management platform 102, analytic applications 104, and trained machine learning models 106. The data management platform 102 and the analytic applications 104 may execute on computing nodes 108. The computing nodes 108 may be distributed processing nodes that are scalable according to workload demand. In various embodiments, the computing nodes 108 may include general purpose computers, such as desktop computers, tablet computers, laptop computers, servers, and so forth. However, in other embodiments, the computing nodes 108 may be in the form of virtual machines, such as virtual engines (VE) and virtual private servers (VPS). The computing nodes 108 may store data in a distributed storage system, in which data may be stored for long periods of time and replicated to guarantee reliability. Accordingly, the computing nodes 108 may provide data and processing redundancy, in which data processing and data storage may be scaled in response to demand. Further, new computing nodes 108 may be added on the fly without affecting the operational integrity of the data management platform 102 and the analytic applications 104.

The data management platform 102 may include a cloud layer that controls hardware resources, and a data management layer that manages data processing and storage. The cloud layer may provide software utilities for managing computing and storage resources. In various embodiments, the cloud layer may provide a generic user interface for handling multiple underlying storage services (e.g., local servers, Amazon AWS, Digital Ocean, etc.) that stores the call data collected by the data management platform 102. The cloud layer may also provide an integrated view of multiple servers and clusters from various providers, such as Hortonworks, Cloudera, MapR, etc.). Additionally, the cloud layer may provide monitoring utilities to oversee utilization of resources and alerts for managing data storage or processing capacity. Accordingly, the cloud layer may facilitate the deployment, configuration, and activation of local and cloud servers, as well as facilitate the deployment, configuration, and activation of applications and/or services.

The data management layer may include software utilities and databases that facilitate the acquisition, processing, storage, reporting, and analysis of data from multiple data sources. In various embodiments, the data management layer may provide an application program interface (API) that decouples backend data management elements from data processing elements, such that the data may be distributed and stored in different data stores. For example, these data stores may include Hadoop distributed File System (HDFS), Apache Spark, Apache HBase, and/or so forth. The APIs of the data management layer may be used by custom analytic engines and/or other third party tools to access the data in the different data stores. The data management layer may further include multiple data adaptors that are able to obtain multiple types of data from multiple data sources. The data management platform 102 may access the multiple data sources via a network. The network may be a local area network (LAN), a larger network such as a wide area network (WAN), or a collection of networks, such as the Internet. The data management platform 102 may use multiple connectors in the form of applications, APIs, protocols, and services, to support connectivity with data sources and data stores, these connectors may include FTP/SFTP, HTTP/HTTPS, Java Message Service (JMS), Apache Kafka, Apache Flume, Apache Solr, Java Database Connectivity (JDBC), User Datagram Protocol (UDP), and/or so forth.

Accordingly, the data management platform 102 may provide the analytic applications 104 with data from a variety of data sources. The data sources may include an operation data source 110, a trouble ticket data source 112, an alarm data source 114, social media data source 116, and other data sources 118 that provide various types of performance data. The operation data source 110 may include a data collection that provides performance information about the wireless carrier network and the user devices that are using the wireless carrier network. In various embodiments, the performance information may include Radio Access Network (RAN) OSS counters, Call Detail Records (CDRs), VoLTE call traces, Session Initiation Protocol (SIP) trace data, Real-Time Transport Protocol (RTP) Control Protocol (RTCP) trace data, user device data traffic logs, user device system event logs, user device bug reports, and/or other device and network component performance information. The data collection may further provide network topology data, network expansion/modification data, network coverage data, and planned maintenance data. The network topology data may include locations of network cells, network backhauls, core network components, and/o so forth. The network coverage data may include information on the signal coverage and communication bandwidth capabilities of the network cells, the performance specifications and operation statuses of backhaul, network cells, and core network components, and/or so forth. The network cells may include macrocells, picocell, femtocells, microcells, and/or so forth.

The performance information on user devices that are provided by the operation data source 110 may further include user device and account information. The device information may indicate technical capabilities, features, and operational statuses of user devices that are used by subscribers on the wireless carrier network. The user account information may include account details of multiple subscribers, such as account types, billing preferences, service plan subscriptions, payment histories, data consumption statistics, and/or so forth.

The trouble ticket data source 112 may include data on issues with the components or operations of the wireless carrier network. In some instances, network trouble tickets may be automatically generated by software agents that monitor the health and performance of the wireless carrier network. In other instances, subscriber trouble tickets may be manually inputted by customers and/or customer care representative to describe issues experienced by the customers. In some instances, subscriber trouble tickets may be inputted as a result of a customer interaction with a chatbot or on a social media service such as Twitter® or the like. In some instances, trouble tickets may be generated and inputted by embodiments of the present invention in response to the embodiments detecting a failure. The trouble ticket data source 112 may further include data on the identities of the administrators, resolution reports for the issues, statistics for each type or category of issues reported, statistics on issue resolution rates, and/or so forth.

The alarm data source 114 may include alerts for the wireless carrier network that are generated based on predetermined alert rules by a status monitoring application of the network. An alert rule may specify that an alert is to be triggered when one or more conditions with respect to the operations of the network occurs. The conditions may be specific faults or issues that are detected with components of the network, deviation of actual performance indicators from predetermined threshold performance values, a number of user complaints regarding a network component, network node, or network service reaching or failing to reach a predetermined threshold, and/or so forth. An alert may also be triggered by a subscriber event such as a change in which plan a subscriber is enrolled in, a change in which device a subscriber is using, or performance degradation specific to the subscriber.

The social media data source 116 may include data collections provided by social networking portals. A social networking portal may be established by a wireless carrier network that is being evaluated by the analytic applications 104. Another social networking portal may be a portal that is maintained by a third-party service provider for users to share social media postings. An additional social networking portal may be a web portal that is created and maintained by a particular user solely for the particular user to present social postings. The social networking portals may enable users to post and share information, reviews, and/or other comments regarding service providers, products, services, merchants, networks, and/or so forth. For example, the social networking portals may include blog web pages, message feed web pages, web forums, and/or electronic bulletin boards. A user may establish a personalized social networking portal so that other users may subscribe to the social postings of the user, leave comments for the user or other visitors to the personalized social networking portal, and/or perform other social networking activities.

Once the data from the social media data collections are obtained via data adapters, a data mining algorithm of the data management platform 102 may extract words, terms, phrases, quotes, or ratings that are relevant to the operational conditions or performance status of the nodes, components, and/or services of the wireless carrier network. The data mining algorithm may use both machine learning and non-machine learning techniques such as decision tree learning, association rule learning, artificial neural networks, inductive logic, Support Vector Machines (SVMs), clustering, Bayesian networks, reinforcement learning, representation learning, similarity and metric learning, and sparse dictionary learning to extract the patterns. In one example, the data management platform 102 may discover a pattern of web blog posting that indicate users are dissatisfied with an aspect of a service provided by the wireless carrier network at a particular geographical location. In another example, the data management platform 102 may discover a pattern of message feed postings from multiple users that indicate a specific type of user device has a high error rate when used in conjunction with the wireless carrier network.

The additional data sources 118 may include other data sources that are controlled by the wireless carrier network or third-parties, such as data reports from the network monitoring tools. In various embodiments, the network monitoring tools may include diagnostic tools, optimization tools, configuration tools, and/or so forth. The data reports may include key performance indicators (KPIs). The KPIs may be generated based on KPI configuration files that designate specific KPIs to be generated. The KPIs may measure the performance of a specific device or network component. Alternatively, the KPIs may also provide high level aggregated performance measurements for multiple network or device components, for particular classes of network or device components, and/or so forth.

The analytic applications 104 may analyze the multiple sources of data obtained by the data management platform 102 to generate data reports 120 and troubleshoot solutions 122. The data reports 120 may provide comprehensive or end-to-end analysis results that aids in the resolution of quality of service issues for the wireless carrier network. For example, the data reports 120 may provide capacity upgrade recommendations, pinpoint malfunctions in device components or network components, provide real-time detection and alerting of quality of service issues, provide suggestions of new geolocations for the installation of small network cells within the wireless carrier network, and/or so forth.

In some embodiments, the analytic applications may include an automatic customer complaint resolution application. The automatic customer complaint resolution application may leverage a trained machine learning model 106 to analyze the user device performance data and the network performance data to determine root causes for quality of service issues for subscribers. Thus, the automatic customer compliant resolution application may provide troubleshooting solutions 122 for the root causes. The trained machine learning model 106 may be created using feature engineering that ascertains the properties and relationships of the training corpus to distinguish between the data classes. Further, the machine learning model 106 may incorporate a combination of multiple machine learning algorithms, such as a Bayesian algorithm, a decision tree algorithm, a (SVM) algorithm, to increase the accuracy of the root cause solutions generated by the model.

The analytic applications 104 may provide the data reports 120 and the troubleshooting solutions 122 for presentation by a dashboard application 124 on the user device 126. The user device 126 may be coupled to the computing nodes 108 via a network. The dashboard application 124 may be enable a user to query and view the data reports 120 and the troubleshoot solutions 122. In some embodiments, the dashboard application 124 may present a dashboard interface that displays the information by different criteria, such as by user, by network component, by geolocation, and/or so forth. Alternatively or concurrently, the dashboard interface may display the information via visual charts and graphs that allows the comparison and differentiation of performance data based on multiple viewing parameters.

Example Computing Device Components

Figure 2:
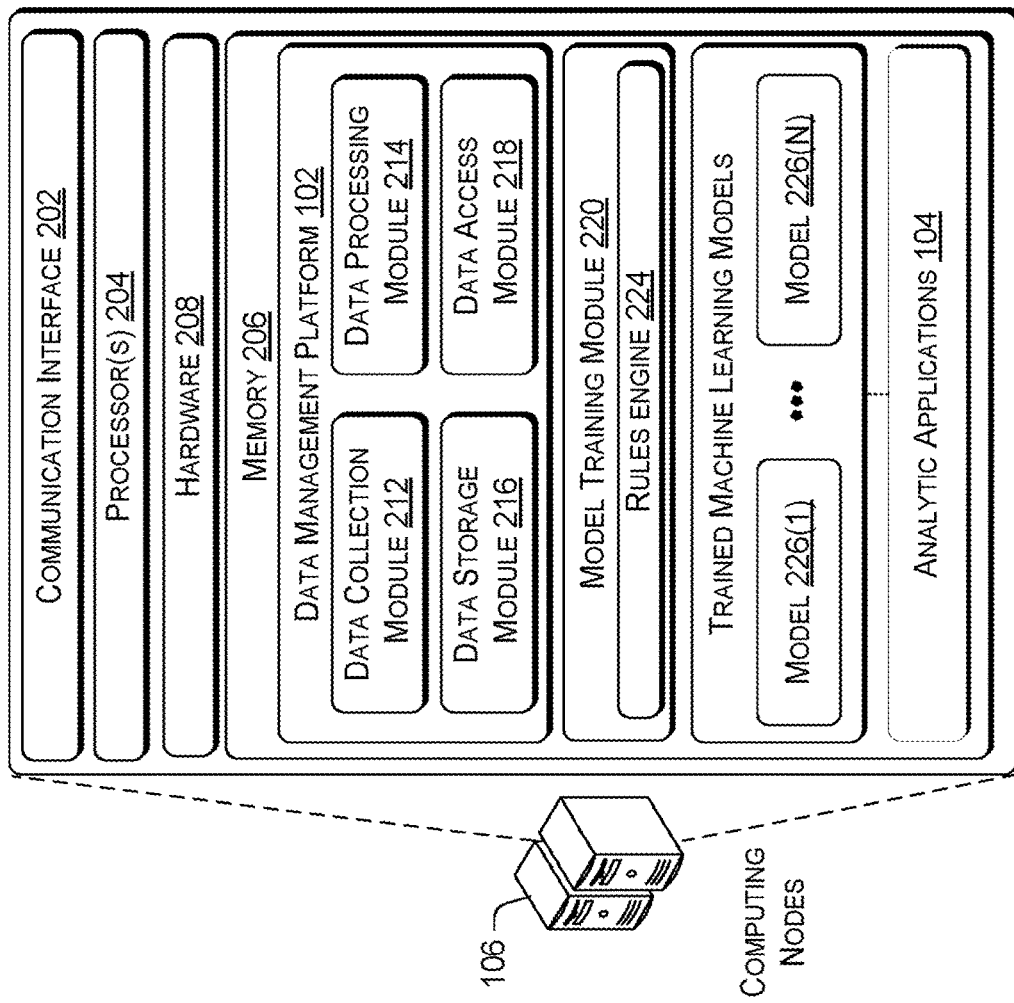
FIG. 2 is a block diagram showing various components of a data management platform and machine learning logic for performing the comprehensive device and network data analysis of a wireless carrier network to resolve quality of service issues.

FIG. 2 is a block diagram showing various components of a data management platform and a performance management engine that performs distributed multi-data source performance management. The data management platform 102 and the analytic applications 104 may be implemented by one or more computing nodes 108 of a distributed processing computing infrastructure. The number of computing nodes 108 may be scaled up and down by a distributed processing control algorithm based on the data processing demands of the data management platform 102 and/or the analytic applications 104. For example, during peak performance data processing times, the number of computing nodes 108 that are executing performance data processing functionalities of the analytic applications 104 may be scaled up on the fly based on processing demand. However, once the processing demand drops, the number of computing nodes 108 that are executing the performance data processing functionalities may be reduced on the fly. Such scaling up and scaling down of the number of computing nodes 108 may be repeated over and over again based on processing demand.

The computing nodes 108 may include a communication interface 202, one or more processors 204, and memory 206. The communication interface 202 may include wireless and/or wired communication components that enable the one or more computing nodes 108 to transmit data to and receive data from other networked devices. The computing nodes 108 may be accessed via hardware 208. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The data management platform 102 may include a data collection module 212, a data storage module 216, and a data access module 218. The modules may include routines, program instructions, objects, and/or data structures that perform particular tasks or implement particular abstract data types. The data collection module 212 may use data adaptors to retrieve data from the structured or unstructured databases of the data sources 110-118. Since the structured databases provide data that are accessible via simple data retrieval algorithms, the data collection module 212 may use data-agnostic data adaptors to access the data sources without taking into consideration the underlying content of the data. Further, changes to the data content in each data source generally do not affect the functionality of the corresponding data-agnostic data adaptors. On the other hand, the data collection module 212 may use database-specific data adaptors to access structured databases.

The data collection module 212 may include a workflow scheduler that periodically checks for and retrieves newly available data from the multiple data sources. The workflow scheduler may handle the extraction and the handling of the data based on configurable policies. For example, a configurable policy may specify the source data location, frequency of data retrieval, handling procedures for late arrival data, data retention period, and data disposal following an expiration of the data retention period. The handling procedures for the late arrival data may specify a predetermined cutoff period during which any data arriving late may be incorporated with data that is retrieved on time for processing. Accordingly, the data collection module 212 may retrieve data with different generation latencies (e.g., one minute, 15 minutes, one hour, one day etc.), as well as data with different spatial aggregation (e.g., network cell data, network node data, radio network controller data, etc.) such that real time or non-real time data analysis may be performed.

In various embodiments, the data processing module 214 may implement adaptor-specific logics to decode the format of the performance data from the data sources 110-118. Accordingly, the performance data may be fed into other modules for analysis and storage. In some embodiments, the data processing module 214 may aggregate data from multiple data sources for a particular time period into an aggregated data file of data sets according to one or more grouping parameters. The grouping parameters may include specific time periods (e.g., hourly, daily, etc.), network components, user device vendor, user device models, and/or so forth. In other embodiments, the grouping parameters may be used to aggregate the data into multiple datasets that correspond to different levels of a network hierarchy. For example, the data may be aggregated into datasets that correspond to a subscriber level, a device level, a service area level, and a geographical market level. The geographical market level may further include a zip code sublevel, a municipality sublevel, or another location-based sublevel that may correspond to datasets for aggregation. Nevertheless, the aggregated data from the multiple data sources may be stored in the data sets according to their own storage schemas. In other embodiments, the data processing module 214 may converge the data from multiple data sources for a particular time period into a converged data file of data sets, in which the data are stored in the data sets according to a unitary storage schema.

The data storage module 216 may store data across multiple virtual data storage clusters with redundancy, so that the data may be optimized for quick access. The stored data may include the performance data from the data sources 110-118, the aggregated and covered data files, data that are generated by the analytic applications 104, and/or so forth. The data access module 218 may provide a data access API for accessing the data stored in the multiple virtual storage clusters. Accordingly, the API may be used by the analytic applications 104 as well as other third-party application to access the data that received and stored by the data management platform 102.

The model training module 220 may trained machine learning models, such as the models 222(1)-222(N), to analyze the performance data from the data sources 110-118 to determine root causes for quality of service issues for subscribers. In various embodiments, the model training module 220 may use a machine learning training pipeline to generate a machine learning model, in which the details of the machine learning training pipe are illustrated in FIG. 3.

Figure 3:
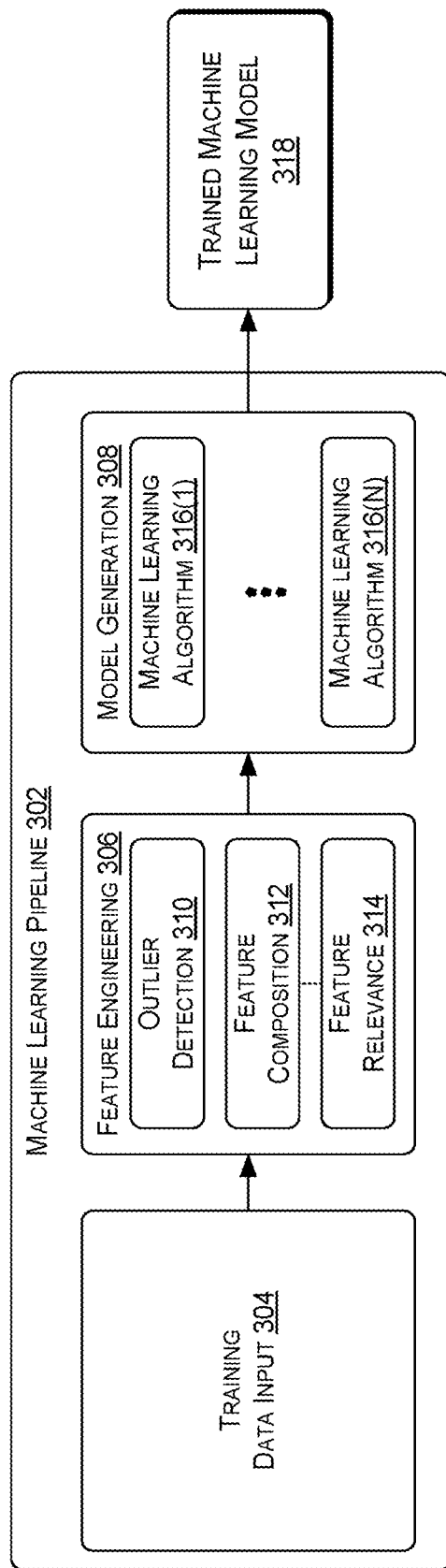
FIG. 3 is a block diagram of a machine learning pipeline for performing automatic customer complaint resolution for a wireless carrier network.

FIG. 3 is a block diagram of a machine learning pipeline 302 that is implemented by the model training module 220 to train a machine learning model for analyzing performance data to determine root causation. The machine learning pipeline 302 may include a training data input phase 304, a feature engineering phase 306, and a model generation phase 308. In the training data input phase 304, the model training module 220 may receive a training corpus comprised of one or more input datasets from the data management platform 102. The training corpus may include training data that emulates data collected from the multiple data sources 110-118 and optionally a set of desired outputs for the training data. For example, the data that is received during the training data input phase 304 may include Operating Support System (OSS) counters, KPIs, network coverage details, device alarm data, network alarm data, device alert data, network alert data, CDRs, and/or so forth.

The model training module 220 may use the feature engineering phase 306 to pinpoint features in the training corpus. Accordingly, feature engineering may be used by the model training module 220 to figure out the significant properties and relationships of the input datasets that aid a model to distinguish between different classes of data. The model training module 220 may perform outlier detection analysis 310, feature composition analysis 312, and feature relevance analysis 314 during the feature engineering phase 306. In the outlier detection analysis 310, the model training module 220 may detect outlier features for exclusion from use in the generation of a machine learning model. In various implementations, the outlier detection analysis 310 may be performed using a clustering algorithm, such as a k-means algorithm, a Gaussian mixture algorithm, a bisecting k-means algorithm, a streaming k-means algorithm, or another outlier detection algorithm.

In the feature composition analysis 312, the model training module 220 may transform at least some of the multiple features in the training corpus into a single feature. Accordingly, feature composition may decrease the number of input features while preserving the characteristics of the features. This decrease in the number of features may reduce the noise in the training corpus. As a result, the composition feature that is derived from the multiple features may improve the classification results for the datasets of the training corpus. In various implementations, the feature composition analysis 312 may be performed using various dimensionality reduction algorithm, such as a Singular Value Decomposition (SVD) algorithm, a Principal Component Analysis (PCA) algorithm, or another type of dimensionality reduction algorithm.

For example, the SVD algorithm may break a matrix of the training corpus into linearly independent components. These components may be a sets of values that approximate the underlying structure of the original dataset of values independently along each dimension. Due to the relatively small size of the components, many of these components may be ignored to generate an approximation of the training corpus that contains substantially fewer dimensions than the original. In another example, the PCA algorithm may use an orthogonal transformation to emphasize variations in the training corpus in order to bring out strong patterns in the data sets. The orthogonal transformation is defined in such a way that the first principal component has the largest possible variance, and each succeeding component in turn has the highest variance possible under the constraint that it is orthogonal to the preceding components.

In the feature relevance analysis 314, the model training module 220 may identify redundant features in the training corpus to in order to eliminate such features from being used in the training of the machine learning model. An excessive number of features may cause a machine learning algorithm to over-fit a training corpus or slowdown the training process. In various implementations, the feature relevance analysis 314 may be performed using a dimensionality reduction algorithm (e.g., the PCA algorithm, a statistics algorithm, and/or so forth). The statistics algorithm may be a summary statistics algorithm, a correlation algorithm, a stratified sampling algorithm, and/or so forth.

The model training module 220 may perform the model generation phase 308 following the completion of the feature engineering phase 306. During the model generation phase 308, the model training module 220 may select an initial type of machine learning algorithm to training a machine learning model using a training corpus. For example, the model training module 220 may model the distribution of feature (x|y=1) and (x|y=0), in which (x|y=1) is the distribution of features when there is a network coverage problem, (x|y=0) is the distribution of features when there is no network coverage problem, and p(y) represents "prior probability". In such a scenario, the model training module 220 may make a prediction based on the models of p(x|y=1) and p(x|y=0) using Bayes' Rule, as follows:

$$p(y|x)=(p(x|y)p(y))/(p(x))=(p(x|y)p(y))/(p(x|y=1)p(y=1)+p(x|y=0)p(y=0)) \quad (1)$$

Thus, an assumption may be made that all $x_i$ features are either binary (0 or 1), or continuous features that are partitioned into bins, i.e., discretize a continuous variable, and that each data point in the training corpus contains 20 binary features, that is:

$$x_1=[1,0,1,1,1 \ldots ,0] \quad (2)$$

in which the modeling of p(x|y) explicitly calls for an unachievable probability table for $2^{20}$ inputs. As a result, the model training module 220 may apply the Naïve Bayes assumption to model p(x|y), as follows:

$$p(x_i|y)=p(x_i|y,x_j) \quad (3)$$

The Naïve Bayes assumption states that if a given input vector x corresponds with a coverage problem i.e., y=1, and feature $x_j$ appears in the input vector, the belief about the presence of the feature $x_i$ in the input vector does not change. In other words, if the input vector represents a network coverage problem, the fact that the input vector indicates that there is "poor network coverage on 3G" will not affect the belief about the status of the feature "poor network coverage on 4G". In the real word this belief may not be true, because there may be a relationship between "poor network coverage on 4G" and "poor network coverage on 3G". However, the Naïve Bayes assumption is ruling out that possibility with the purpose of simplifying the estimation of p(x|y), as follows:

$$p(x_1, x_2, x_3, \ldots x_{20} \mid y) = p(x_1 \mid y)p(x_2 \mid y, x_1) \quad (4)$$

$$p(x_3 \mid y, x_1, x_2) \ldots p(x_{20} \mid y, x_1, x_2, x_3, \ldots x_{19}) =$$

$$p(x_1 \mid y)p(x_2 \mid y)p(x_3 \mid y) \ldots p(x_{20} \mid y) = \prod_i^{20} p(x_i \mid y)$$

Therefore, $$p(y = 1 \mid x) = \frac{p(x \mid y = 1)p(y = 1)}{p(x)} = \quad (5)$$

$$\frac{\prod_i^{20} p(x_i \mid y = 1)p(y = 1)}{\prod_i^{20} p(x_i \mid y = 1)p(y = 1) + \prod_i^{20} p(x_i \mid y = 0)p(y = 0)}$$

Following the application of a selected machine learning algorithm to the training corpus, the model training module 220 may determine a training error measurement of the machine learning model. The training error measurement may indicate the accuracy of the machine learning model in generating a solution. Accordingly, if the training error measurement exceeds a training error threshold, the model training module 220 may use a rules engine 224 to select an additional type of machine learning algorithm based on a magnitude of the training error measurement. The training error threshold may be a stabilized error value that is greater than zero. In various embodiments, the rules engine 224 may contain algorithm selection rules that match specific ranges of training error measurement values to specific types of machine learning algorithms. The different types of machine learning algorithms may include a Bayesian algorithm, a decision tree algorithm, a SVM algorithm, an ensemble of trees algorithm (e.g., random forests and gradient-boosted trees), an isotonic regression algorithm, and/or so forth.

Following the selection of the additional type of machine learning algorithm, the model training module 220 may execute the additional type of machine learning algorithm on the training corpus to generate training results. In some instances, the model training module 220 may also supplement the training corpus with additional training datasets prior to the additional execution. The generated training results are then incorporated by the model training module 220 into the machine learning model. Subsequently, the model training module 220 may repeat the determination of the training error measurement for the machine learning model, and the selection of one or more types of additional machine learning algorithms to augment the machine learning model with additional training results until the training error measurement is at or below the training error threshold.

Accordingly, the model training module 220 may use the machine learning algorithms 316(1)-316(N) to generate a trained machine learning module 318.

Returning to FIG. 2, the analytic applications 104 may analyze the multiple sources of data obtained by the data management platform 102 to generate data reports 120 and troubleshoot solutions 122. The analytic applications 104 may have built in application user interfaces that simplify the data querying and requesting process such that status data and troubleshooting solutions may be provided via the application user interfaces. The application user interfaces of the analytic applications 104 may be displayed by the dashboard application 124. The analytic applications may process real time or non-real time data, in which data from multiple data sources may be aggregated or converged. The data reports 120 may provide real time or non-time views of device and network status data based on the performance data from the data sources 110-118. Accordingly, a user may use the data reports 120 to continuously or periodically monitor the statuses pertaining to all aspects of the wireless carrier network. The aspects may include the statuses of wireless carrier network itself, the network components of the network, user devices that are using the wireless carrier network, and/or device components of the user devices.

In further embodiments, the analytic applications 104 may generate troubleshooting solutions using one or more of the trained machine learning models 226(1)-226(N). The troubleshooting solutions may be generated based on the performance data from one or more of the data sources 110-118 provided by the data management platform 102. For example, the trained machine learning models may be used to automatically analyze CDRs to identify root causes of quality of service issues with the wireless carrier network. In other examples, the trained machine learning modules may be used to improve network quality of service, increase network performance efficiency, analyze cell data to identify fraud, analyze patterns to predict subscriber, analyze subscriber usage patterns to identify geographical area for implementing new network services. For example, an analytic application may use a trained machine learning model to identify a root cause for an issue that is the subject of a subscriber trouble ticket, a subject of a network generated trouble ticket, or detected by an analytic application. In various embodiments, the analytic application may retrieve a troubleshooting solution from a solutions database that resides on the computing nodes 108 based on a diagnosed root cause of an issue.

In some embodiments, an analytic application may provide an application user interface that enables a user to provide feedback on whether a trained machine learning model was effective in resolving a quality of service issue. In such embodiments, the subscriber or a customer service representative may use an application user interface provided by the analytic application to indicate whether the solution is effective in resolving the issue outlined in the trouble ticket. Thus, if the feedback is that the solution did not resolve the issue, the analytic application may refer the trouble ticket to a network engineer for resolution. Furthermore, the analytic application may provide an indication to the model training module 220 that the solution did not work. In turn, the model training module 220 may retrain a machine learning model. During retraining, the model training module 220 may receive an input from the engineer indicating a correct solution to an issue outlined in the trouble ticket. Accordingly, the input from the engineer may be added as a data point to the training corpus for retraining of the machine learning algorithms of the machine learning model. In some instances, the engineering may also provide additional input to the model training module 220 that indicates specific anomalous data (e.g., observations or assertions) to be removed from the training corpus. The removal of the specific anomalous data from the training corpus may prevent the machine learning model from generating ineffective solutions for performance data inputs.

Alternatively or concurrently, the model training module 220 may configure the rules engine 224 to modify the algorithm selection rules during retraining. The modifications to the algorithm selection rules may change a range of training error measurement values that correspond to a type machine of learning algorithm, cause specific ranges of training error measurement values to match to different types of machine learning algorithms, and/or so forth. In this way, the model training module 220 may generated a modified trained machine learning model based on the feedback.

A summary of different types of performance data and the output results that are generated by the permutations of features of analytic applications 104 are listed in below, in which the monitoring output type corresponds to the generation of data reports 120, and analytics output type corresponds to the generation of troubleshooting solutions 122:

TABLE

Comparison of Input and Output Data
Types of the Analytic Applications

| Type of Data Source | Temporality of Data | Output Type |
|---|---|---|
| Aggregated | Non-Real Time | Monitoring |
| Aggregated | Non-Real Time | Analytics |
| Aggregated | Real Time | Monitoring |
| Aggregated | Real Time | Analytics |
| Converged | Non-Real Time | Monitoring |
| Converged | Non-Real Time | Analytics |
| Converged | Real Time | Monitoring |
| Converged | Real Time | Analytics |

Additional details regarding the operations of the analytic applications 104 are described below with respect to FIGS. 5 and 9-14.

Example User Interface

FIG. 4 is an illustrative user interface 400 of an automatic customer complaint resolution application that provides a root cause and a resolution for a service issue. The user interface 400 may include an application menu section 402, a ticket selection section 404, and a ticket detail section 406. The application menu section 402 may provide options that enables a user to view subscriber trouble tickets, network trouble tickets, alarm data, overall network performance data, as well as data regarding individual calls of subscribers. For example, a user may select network performance to show different visualizations of network performance. The different visualizations of network performance may be filtered by zip code, by a particular geographical area, by a particular network cell, by a particular user device, and/or so forth. However, as shown in FIG. 4, a user has selected the subscriber trouble ticket option such that the user is able to view trouble tickets that are initiated by specific subscribers.

The selection of the subscriber trouble ticket option may cause the user interface 400 to display the ticket selection section 404. The ticket selection section 404 may include options for the selecting subscriber trouble tickets that fall within a specific date range for display. For example, a user is able to select a specific date and a range of dates that immediately precede the specific date. In turn, the ticket selection section 404 may display subscriber tickets that fall within the specific date range. For example, as show in FIG. 4, a subscriber trouble ticket for a coverage problem experience by the user device of a particular subscriber may be displayed in the ticket selection section 404.

The selection of a subscriber trouble ticket that is displayed in the ticket selection section 404 may cause the ticket detail section 406 to display details for the ticket. For example, the ticket selection section 404 may show a nature of the service complaint, a description of the service issue, details for the user device that is associated with the service complaint, including device type information for the user device (e.g., device make, device model). In this case, the service complaint is frequent dropped calls regardless of user device location. Furthermore, the ticket detail section 406 may further display a root cause of the service issue as determined by the automatic customer complaint resolution application. For example, the ticket detail section 406 may show that the root cause is failures of call handover between network cells for the user device. Accordingly, the solution for solving the root cause may be the reconfiguration of the network cells to modify timing of handover initiation commands sent to the specific type of the user device. The modification may ensure that dropped calls due to network cell handovers may be diminished or eliminated.

Thus, as shown in FIG. 5, the implementation of an automatic customer complaint resolution application 500 may initially involve data collection 502. The data collected may include topology data, performance data, trouble ticket data, alerts, etc., for a specific time period and/or specific groups. For example, the trouble ticket data may be collected for a previous hour for specific groups of network nodes and/or user devices. In at least one embodiment, the trouble ticket data may include lists of trouble tickets, compliant details associated with each ticket, network coverage information, site/node frequency band support information, and/or so forth. During data preparation 504, the data may be prepared for analysis via aggregation, convergence, and/or other forms of data processing. In some embodiments, the automatic customer complaint resolution application may also perform ticket update 506. During the ticket update 506, the trouble tickets may be updated based on data from other sources. For example, customer trouble ticket data may be updated with corresponding CDR data or other performance data that are related to each customer trouble ticket.

Collecting trouble ticket data may include performing Natural Language Processing (NLP) on fields of one or more trouble tickets. The NLP may be used to detect keywords, including detecting keywords from term having similar meanings to the keywords, and to provide insight into the trouble ticket. For example, NLP may be used to determine the severity (in the user's opinion) of an issue reported in a user-originated trouble ticket from the language used to describe the issue, such as by analyzing adjectives and adverbs used by the user to describe the issue, or by the user's use of profanity.

Following the updating of the trouble tickets data, the automatic customer complaint resolution application 500 may perform data analysis. The data analysis may involve trouble ticket trend analysis 508 that provides trouble ticket trends 510 for specific areas, such as particular markets or particular zip codes. In some instances, the automatic customer complaint resolution application 500 may perform trouble ticket clustering 512 during the trouble ticket trend analysis.

The ticket trend analysis 508 may perform anomaly detection on ticket trends. For example, the ticket trend analysis 508 may monitor trends of tool results and identify whether there is an anomalous increase or decrease of resolutions of a certain category, and create a system alert. When an anomalous ticket trend is detected, an option to temporarily deactivate closed loop operation of the machine learning models in the affected ticket categories may be provided. In embodiments, the closed loop operation of the machine learning models may be deactivated until an operator re-activates it. In other embodiments, the closed loop operation of the machine learning models may be automatically re-activated when the anomalous ticket trend ceases. In embodiments, the anomalous ticket trend detection may operate to counter coordinated attempts to compromise system operations, such may be attempted by, for example, the creation of improper trouble tickets in response to a viral trend on social media.

The trouble ticket clustering 512 may enable the automatic customer complaint resolution application 500 to provide clustered trouble ticket data scores for different regions, such as different neighborhoods. The trouble ticket clustering 512 may group or link trouble tickets having a common originating cause into a master trouble ticket. In an embodiment, the trouble ticket clustering 512 may group similar tickets using clustering techniques in order to facilitate labeling into root cause categories, thereby simplifying training of a machine learning model. The data analysis may further involve individual ticket analysis 514 to resolve tickets. The individual ticket analysis 514 may include the analysis of associated data to 516 for individual trouble tickets. For example, the associated data may include user KPIs, network KPIs, alerts, network component health indicators, and/or so forth. Thus, by using a ticket resolution logic 518 that includes one or more trained machine learning models, the automatic customer complaint resolution application 500 may determine a root cause for resolving the trouble ticket. In various instances, the ticket resolution logic 518 may use predefined analytic rules, as well as parameters for prioritizing analysis of different types of collected data. In some embodiments, the automatic customer complaint resolution application 500 may include a ticket action manager 520 that implements a decision flow and defines the actions to be taken for every trouble ticket. Following the analysis, the ticket resolution logic 518 may generate resolution messages that provide details for resolving the trouble tickets. In some instances, the ticket resolution logic 518 may also generate a work log that documents the root causes and resolutions for the trouble tickets.

Example Processes

FIGS. 6-14 present illustrative processes 600-1400 for performing comprehensive device and network data analysis of a wireless carrier network to resolve quality of service issues. Each of the processes 600-1400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600-1400 are described with reference to the architecture 100 of FIG. 1.

Figure 6:
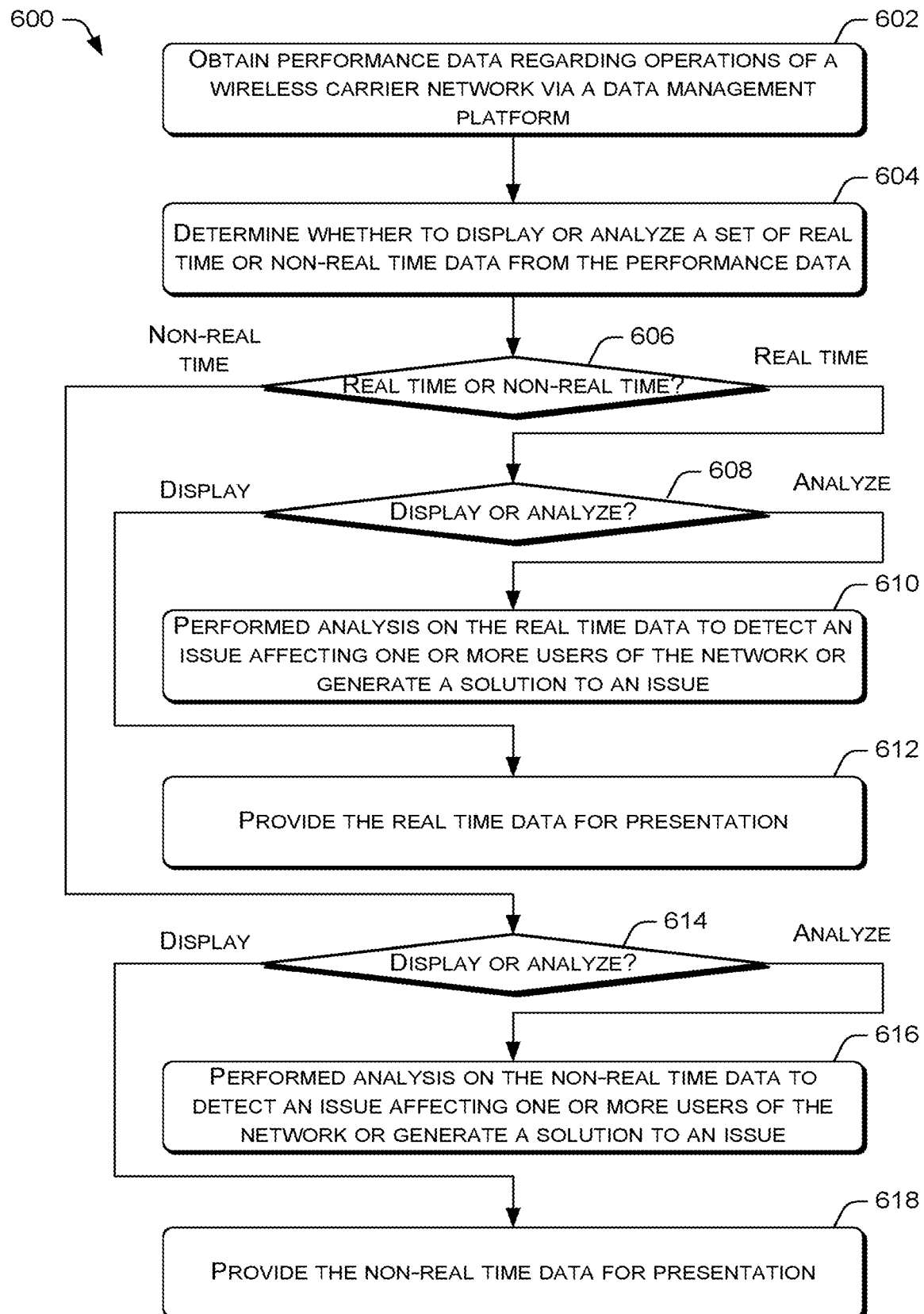
FIG. 6 is a flow diagram of an example process for performing monitoring and machine learning-based analysis of device and network performance data to resolve quality of service issues.

FIG. 6 is a flow diagram of an example process 600 for performing monitoring and machine learning-based analysis of device and network performance data to resolve quality of service issues. At block 602, the data management platform 102 may obtain performance data regarding operations of a wireless carrier network. The performance data may include operation data obtained from the operational data source 110, trouble ticket data from the trouble ticket data source 112, alarm data from the alarm data source 114, relevant social media data from the social media data source 116, and additional data from the other data sources 118. The performance data may be relevant to the one or more network components of the wireless carrier network or one or more device components of user devices that use the wireless carrier network. In an embodiment, the performance data may include previously-resolved trouble tickets related to the one or more network components of the wireless carrier network or one or more device components of user devices that use the wireless carrier network.

In embodiments, at S602 the process 600 may receive information from a Networks Operations Center (NOC) Automation system and uses that information to group issues together and improve the accuracy of the responses generated by the process 600. The NOC automation system may be a system configured to perform network optimization. The information from the NOC Automation system may include details on detected outages and network issues.

In embodiments, at S602 the process 600 may receive information from a proactive automated customer care system that detects potential customer issues, determined customer-level repair actions, and performs customer performance monitoring. The information from the proactive automated customer care system may include customer performance data.

In embodiments, at S602 the process 600 may also obtain provisioning data related to a user for use in the analysis. The provisioning data may include a type of a subscription of the user, an allowed speed of the user, allowed services of the user, and so on. In embodiments, the provisioning data may be provided to a machine learning model as an input when the process 600 performs analysis at blocks 610 or 616, as described below.

At block 604, an analytic application may determine whether to display or analyze a set of real time or non-real time data from the input data. In various embodiments, the display or analysis of the real time may enable the analytic application to facilitate performance monitoring. On the other hand, the display or analysis of the non-real time may enable the analytic application to facilitate the diagnosis and resolution of performance issues. The analytic application may make such a determination based on a query that is inputted into an application user interface that is provided by the application. Thus, at decision block 606, if the analytic application determines that real time data is to be analyzed or displayed, the process 600 may proceed to decision block 608.

At decision block 608, the analytic application may determine whether the real time data is to be displayed or analyzed. The analytic application may make such a determination based on the performance data query that is inputted into the application user interface of the application. Thus, if the analytic application determines that the real time data is to be analyzed, the process 600 may proceed to block 610.

At block 610, the analytic application may perform analysis of the real time data to detect an issue affecting one or more subscribers of the wireless carrier network or generate a solution to an issue. In some embodiments, the analytic application may perform the analysis using a machine learning model. The analytic application may provide the issue and/or the solution for display via the application user interface.

In some embodiments, the real-time data may include subscriber trouble tickets inputted to the trouble ticket data source 112 as a result of a customer interaction with a chatbot. or on a social media service such as Twitter® or the like. In such a case, at block 610 the analytic application may present the generated solution to the customer via the chatbot or social media service. The generated solution may be a solution that may implemented by the customer, such as by changing a customer-controlled setting on a customer device.

In an embodiment, the analytic application may the perform analysis by including information from one or more previous trouble tickets related to the issue. The previous trouble tickets may include previously-resolved trouble tickets, previous tickets that were not resolved, or both. The previous trouble tickets may be analyzed with one or more present trouble tickets using case-based reasoning to resolve the one or more present trouble tickets based on historical resolutions of the one or more previous trouble tickets.

However, returning to decision block 608, if the analytic application determines that the real time data is to be displayed, the process 600 may proceed to block 612. At block 612, the analytic application may provide the real time data for presentation via the application user interface.

Returning to decision block 606, if the analytic application determines that the non-real time data is to be analyzed or displayed, the process 600 may proceed to decision block 614. At decision block 614, the analytic application may determine whether the non-real time data is to be displayed or analyzed. The analytic application may make such a determination based on the performance data query that is inputted into the application user interface of the application. Thus, if the analytic application determines that the real time data is to be analyzed, the process 600 may proceed to block 616.

At block 616, the analytic application may perform analysis of the non-real time data to detect an issue affecting one or more subscribers of the wireless carrier network or generate a solution to an issue. In some embodiments, the analytic application may perform the analysis using a machine learning model. The analytic application may provide the issue and/or the solution for display via the application user interface.

In some embodiments, the non-real time data may include subscriber trouble tickets inputted to the trouble ticket data source 112 as a result of a customer interaction with a chatbot. or on a social media service such as Twitter® or the like.

In an embodiment, the analytic application may the perform analysis by including information from one or more previous trouble tickets related to the issue. The previous trouble tickets may include previously-resolved trouble tickets, previous tickets that were not resolved, or both. The previous trouble tickets may be analyzed with one or more present trouble tickets using case-based reasoning to resolve the one or more present trouble tickets based on historical resolutions of the one or more previous trouble tickets.

However, returning to decision block 614, if the analytic application determines that the non-real time data is to be displayed, the process 600 may proceed to block 618. At block 618, the analytic application may provide the real time data for presentation via the application user interface.

In embodiments, the results of the analysis performed by the process 600 may be provided to an automated Network Advisor system that provides optimization recommendations, complex troubleshooting recommendations, and network level actions for the wireless network.

Figure 7:
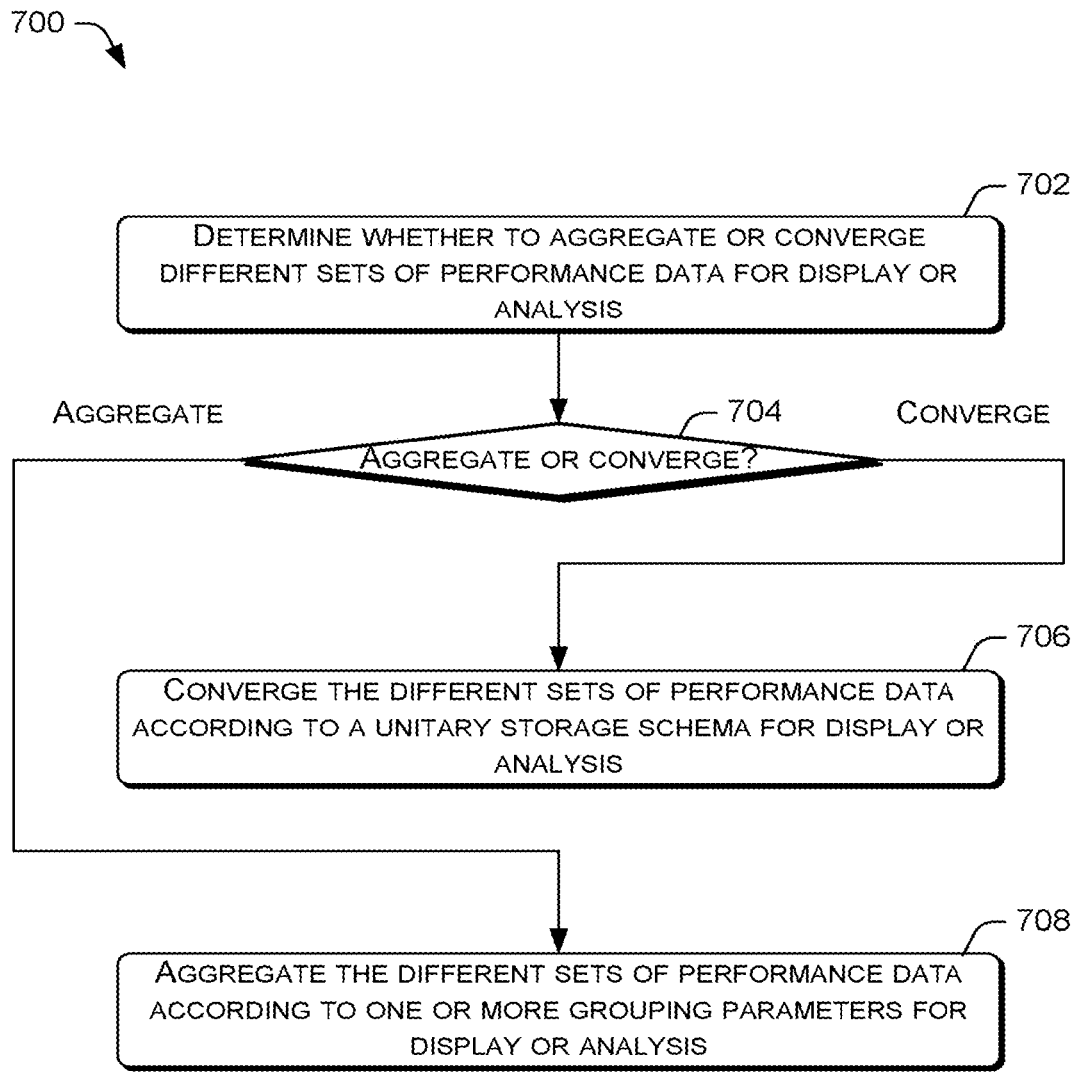
FIG. 7 is a flow diagram of an example process for aggregating or converting multiple sets of data for display or analysis.

FIG. 7 is a flow diagram of an example process 700 for aggregating or converting multiple sets of data for display or analysis. An analytic application may perform the process 700 prior to analyzing or displaying at least some of the performance data collected by the data management platform 102. At block 702, the analytic application may determine whether to aggregate or converge different sets of performance data for display or analysis. The analytic application may make such a determination based on the performance data query that is inputted into the application user interface of the application. Thus, at decision block 704, if the analytic application determines that the different sets of performance data are to be converged, the process 700 may proceed to block 706. At block 706, the data management platform 102 may converge the different sets of performance data according to a unitary storage schema for display or analysis. The convergence of the different sets of performance data by the data management platform 102 may be performed based on a request from the analytic application. In alternative embodiments, the data management platform 102 may converge the different sets of performance data in advance based on a predicted or expected request for the converged data from the analytic application.

Returning to decision block 704, if the analytic application determines that the different sets of performance data are to be aggregated, the process 700 may proceed to block 708. At block 708, the data management platform 102 may aggregate the different sets of performance data according to one or more grouping parameters for display or analysis. The aggregation of the different sets of performance data by the data management platform 102 may be performed based on a request from the analytic application. In alternative embodiments, the data management platform 102 may aggregate the different sets of performance data in advance based on a predicted or expected request for the aggregated data from the analytic application.

Figure 8:
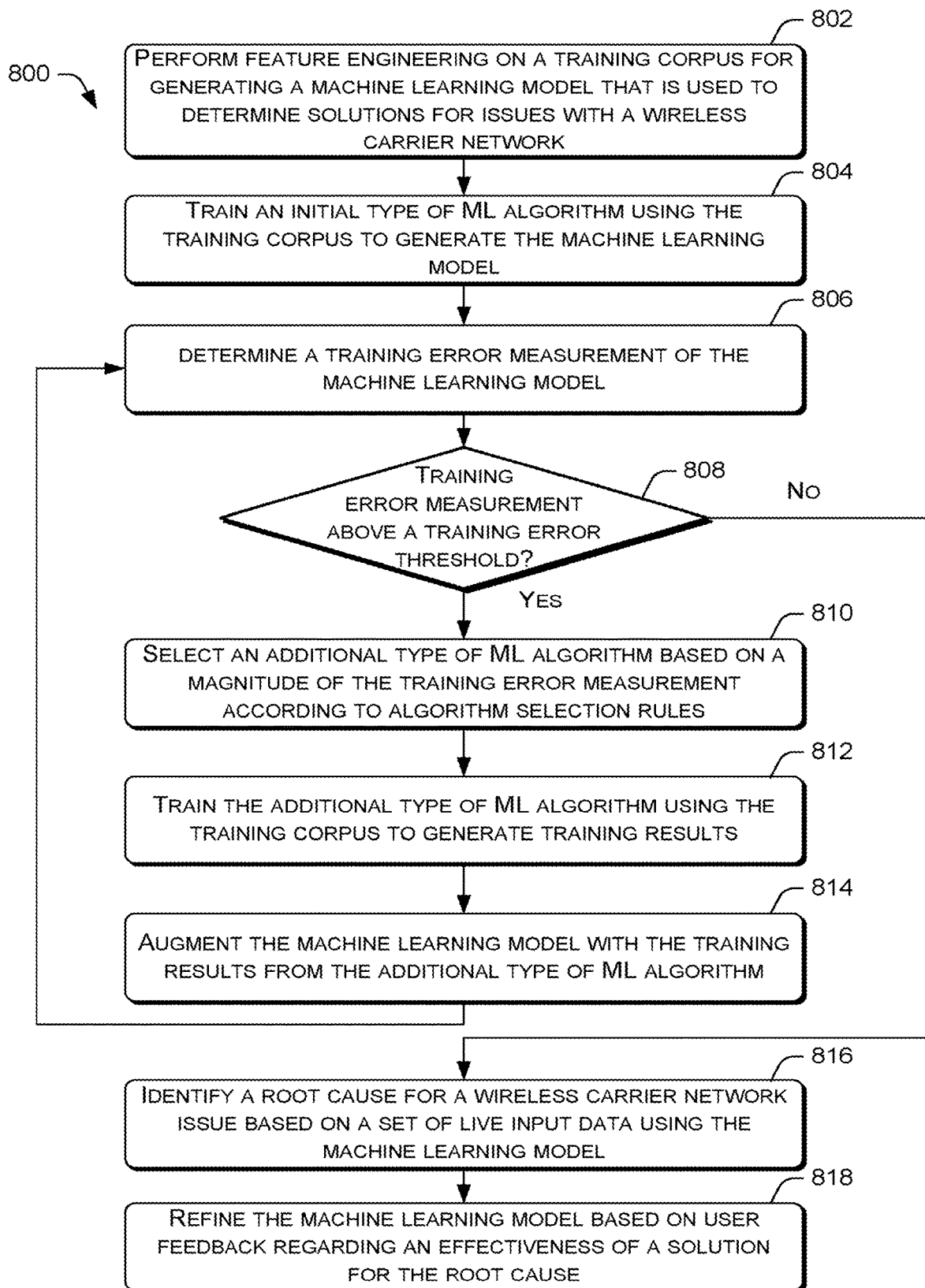
FIG. 8 is a flow diagram of an example process for training a machine learning model to generate a solution to a quality of service issue for a wireless carrier network.

FIG. 8 is a flow diagram of an example process 800 for training a machine learning model to generate a solution to a quality of service issue for a wireless carrier network. At block 802, the model training module 220 may perform feature engineering on a training corpus for generating a machine learning model. The machine learning model is used to determine solutions for issues with a wireless carrier network that affects one or more user devices. In various embodiments, the feature engineering may include performing outlier detection analysis, feature composition analysis, and/or feature relevance analysis to reduce noise in the training corpus and reduced the amount of data that is processed during the training of machine learning models.

At block 804, the model training module 220 may train an initial type of machine learning algorithm using the training corpus to generate the machine learning model. In various embodiments, the initial type of machine learning algorithm may be a Bayesian algorithm, a decision tree algorithm, a SVM algorithm, an ensemble of trees algorithm (e.g., random forests and gradient-boosted trees), or an isotonic regression algorithm.

At block 806, the model training module 220 may determine a training error measurement of the machine learning model. The training error measurement may indicate the accuracy of the machine learning model in generating a solution in comparison to an expected baseline accuracy. Thus, at decision block 808, if the model training module 220 determines that the training error measurement is above a training error threshold, the process 800 may proceed to block 810. At block 810, the model training module 220 may select an additional type of machine learning algorithm to be trained based on a magnitude of the training error measure in accordance with algorithm selection rules. In various embodiments, the algorithm selection rules may be used by a rules engine of the model training module 220 to match a specific ranges of training error measurement value to a specific type of machine learning algorithm.

At block 812, the model training module 220 may train the additional type of machine learning algorithm using the training corpus to generate training results. The additional type of machine learning algorithm may differ from the initial type of machine learning algorithm. For example, if the initial type of machine learning algorithm is a Bayesian algorithm, then the additional type of machine learning algorithm may be a decision tree algorithm.

At block 814, the model training module 220 may augment the machine learning model with the training results from the additional type of machine learning algorithm. Subsequently, the process 800 may loop back to block 806 so that another training error measurement of the machine learning model may be determined. Returning to decision block 808, if the model training module 220 determines that the training error measurement is at or below the training error threshold, the process 800 may proceed directly to block 816 as the generation of a trained machine learning model is deemed to be complete.

At block 816, an analytic application may identify a root cause for an issue affects one or more subscribers of a wireless carrier network based on a set of live performance data using the machine learning model. The analytic application may further generate a solution for the root cause using a solutions database. In various embodiments, the live performance data may be real time or non-real time data pertaining to one or more network components of the wireless carrier network and/or one or more device components of the user devices that are using the wireless carrier network. The live performance data may include aggregated or converged data sets that are obtained from the data sources 110-118. The live performance data may be selected for analysis by a user via an application user interface of the analytics application. In turn, the analytic application may provide the solution that is generated using the machine learning model via the application user interface.

At block 818, the model training module 220 may refine the machine learning model based on user feedback regarding an effective of the solution. In various embodiments, the feedback in the form an indication of whether the solution solved or did not solve the issue may be received by the analytic application via an application user interface. In turn, the analytic application may pass an indication that the solution was ineffective to the model training module 220. In response to the indication, the model training module 220 may retrain the machine learning model. During retraining, the feedback may be added as one or more data points to the training corpus for training the machine learning algorithms of the machine learning model. The feedback may further indicate specific anomalous data (e.g., observations or assertions) to be removed from the training corpus. Alternatively or concurrently, the refinement may include the modification of the algorithm selection rules. The modifications to the algorithm selection rules may change a range of training error measurement values that correspond to a type machine of learning algorithm, cause specific ranges of training error measurement values to match to different types of machine learning algorithms, and/or so forth.

Figure 9:
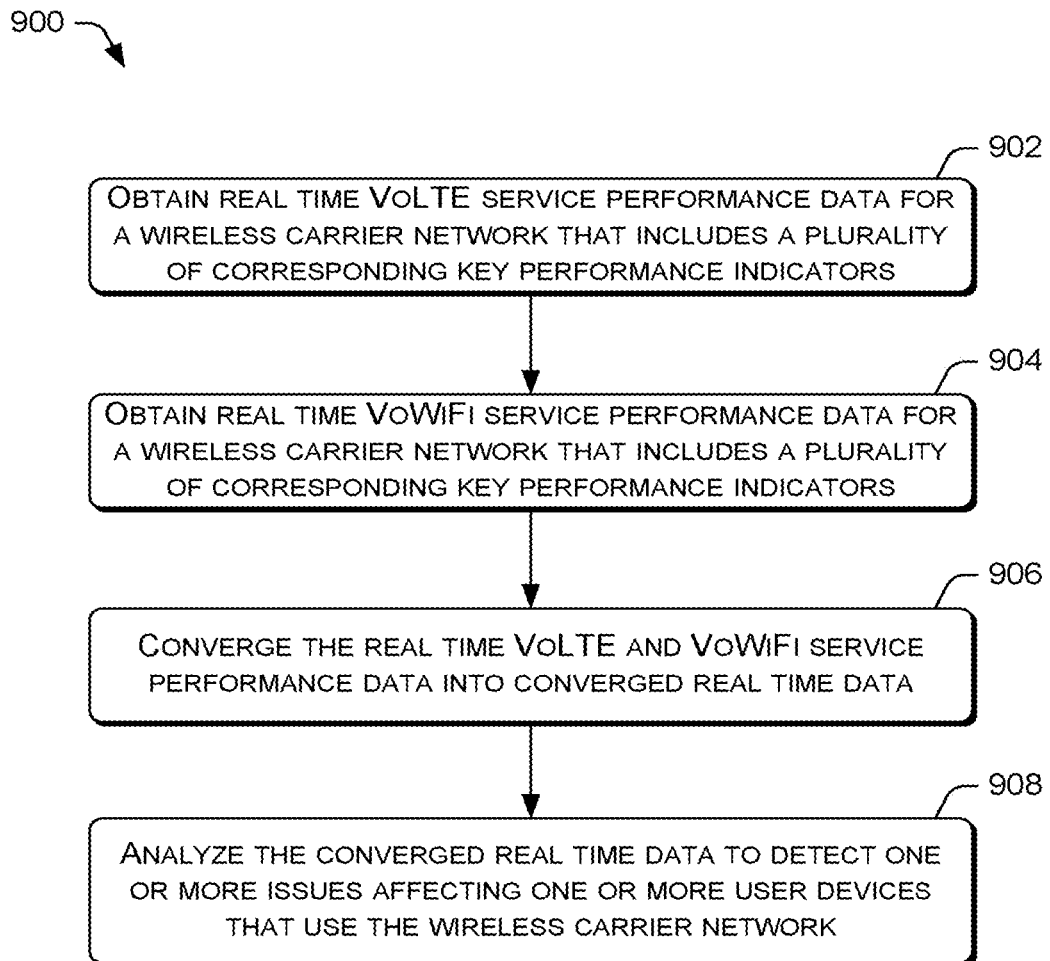
FIG. 9 is a flow diagram of an example process for increasing VoLTE/VoWiFi service visibility to perform real-time detection and alerting of problems that affect the quality of service for a wireless carrier network.

FIG. 9 is a flow diagram of an example process 900 for increasing VoLTE/VoWiFi service visibility to perform real-time detection and alerting of problems that affect the quality of service for a wireless carrier network. At block 902, the data management platform 102 may obtain real-time voice over LTE (VoLTE) performance data for a wireless carrier network that includes a plurality of corresponding KPIs. The plurality of KPIs may measure the performance of network components of the wireless carrier network and/or performance of device components of user devices that use the wireless carrier network. In various embodiments, the KPIs may be high level KPIs that capture service performance, such as call establishment delays, mean opinion scores (MOS) of call audio quality, one-way audio problems, and network cell handover problems.

At block 904, the data management platform 102 may obtain real time voice over WiFi (VoWiFi) service performance data for a wireless carrier network that includes a plurality of corresponding KPIs. The plurality of KPIs may measure the performance of network components of the wireless carrier network and/or performance of device components of user devices that use the wireless carrier network. In various embodiments, the KPIs may be high level KPIs that capture service performance, such as call establishment delays, MOS of call audio quality, one-way audio problems, difficulties with transitions between VoWiFi and VoLTE, and/or so forth.

At block 906, the data management platform 102 may converge the real time VoLTE and VoWiFi service performance data into converged real time data. The convergence may transform the datasets of the real time VoLTE and VoWiFi data storage according to a unitary storage schema. The data management platform 102 may perform such transformation for an analytic application that is to analyze the converged real time data.

At block 908, the analytic application may analyze the converged real time data to detect one or more issues affecting one or more user devices that use the wireless carrier network. The issues may be a large scale problem that may otherwise go undetected without the use of the trained machine learning model. For example, an issue may be a widespread problem with a specific type of user devices or a specific type of agent application on user devices. In various embodiments, the analytic application detect any issue with a specific type of device component or network component when the values of one or more KPIs that measure device or network component performances differ from their respective predetermined acceptable values or predetermined acceptable value ranges.

Figure 10:
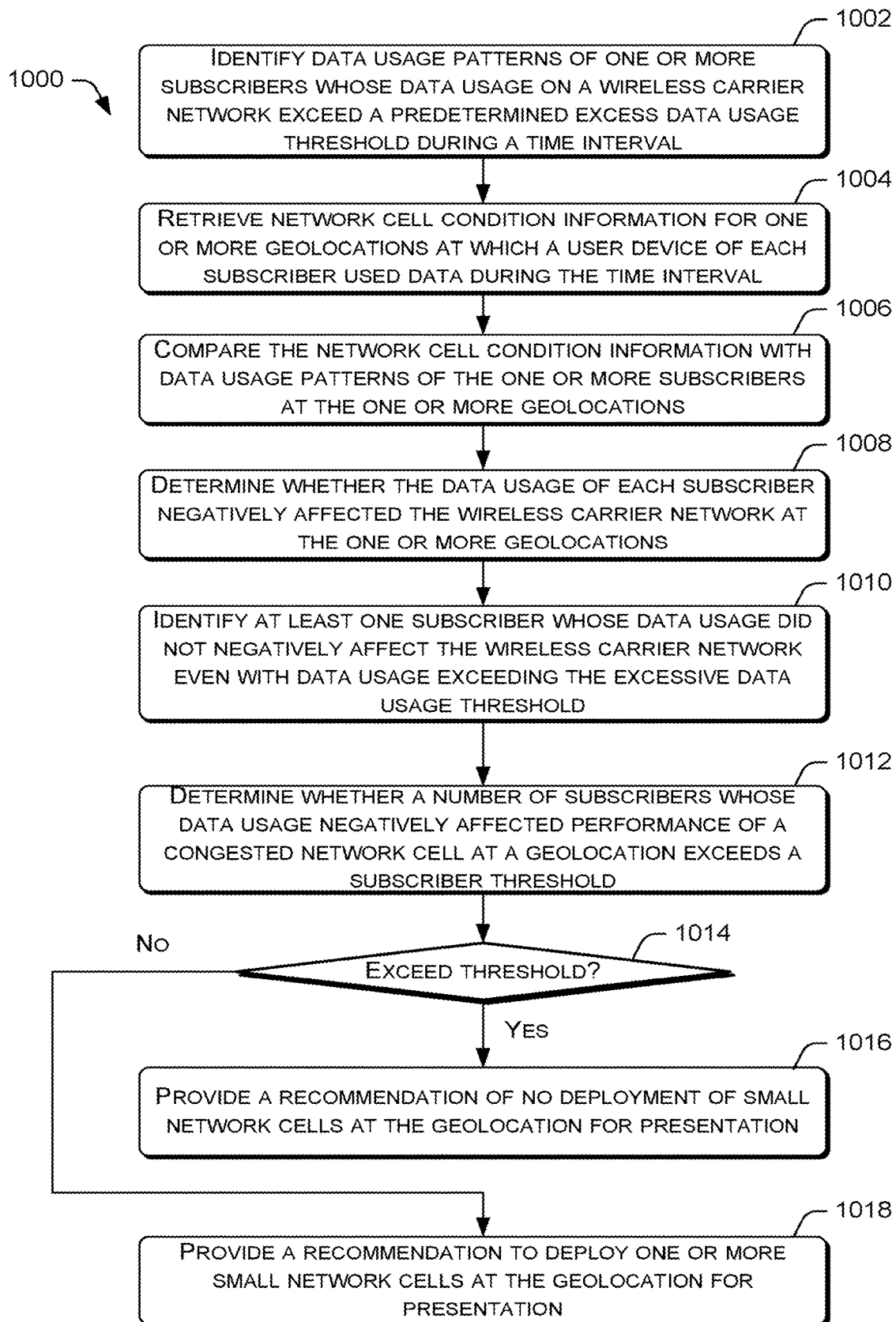
FIG. 10 is a flow diagram of an example process for performing resource-aware subscriber monitoring to identify undesired excessive data usage by subscribers and ascertain capacity upgrade locations for the wireless carrier network.

FIG. 10 is a flow diagram of an example process 1000 for performing resource-aware subscriber monitoring to identify undesired excessive data usage by subscribers and ascertain capacity upgrade locations for the wireless carrier network. At block 1002, an analytic application may identify data usage patterns of one or more subscribers whose data usage on a wireless carrier network exceed a predetermined excess data usage threshold during a time interval. For example, the excess data usage threshold may be 50 gigabytes per month, and a user may have used 60 gigabytes in a month. The analytic application may identify these subscribers by reviewing the data usage patterns of multiple subscribers of the wireless carrier network as collected by the data management platform 102. In various embodiment, the data usage pattern of a subscriber may indicate the geolocations at which the subscriber is consuming the data, the amount of data used in a time period (e.g., one day, one week, one month, etc.), the peak and off peak data usage times in a daily cycle, the type of data consumption (e.g., media streaming, web browsing, gaming, etc.) that the subscriber engages in, and/or so forth.

At block 1004, the analytic application may retrieve network cell condition information for one or more geolocations at which the user device of each subscriber used data during a time interval from a data store of the computing nodes 108. In various embodiments, the network cell condition information for a geolocation may include the amount of network bandwidth available at different times in a daily cycle, the signal spectrums of the network cell that are utilized at different times, the signal coverage area of the network cell, the distances between the network cell and other network cells, and/or so forth. The network cell conditions may be obtained by the data management platform 102.

At block 1006, an analytic application may compare the network cell condition information with data usage patterns of the one or more subscribers at the one or more geolocations. The comparison may indicate correlations between data usage by the one or more subscribers and available bandwidth of network cells at the different geolocations. At block 1008, the analytic application may determine whether data usage of each subscriber negatively affected the wireless carrier network at the one or more geolocations. For example, data usage by some of the subscribers who engaged in excess data usage negatively affected network bandwidth availability at a network cell because the usage occurred at peak times. However, data usage by other subscribers with excess usage may have occurred at non-peak times and therefore did not negatively affect network bandwidth availability at the network cell. In another example, the excess data usage by a subscriber may not negatively affect the bandwidth availability of a network cell of a geolocation due to a high concentration of other network cells proximate to the geolocation.

At block 1010, the analytic application may identify at least one subscriber whose data usage did not negatively affect the wireless carrier network even with data usage exceeding the excessive data usage threshold. At block 1012, the analytic application may determine whether a number of subscribers whose data usage negatively affected the performance of a congested network cell at a geolocation exceeds a subscriber threshold. In various embodiments, a network cell may be determined to be congested if the available bandwidth of the network cell drops below an availability threshold, if the number of call failures due to lack of response from the network cell exceeds a call failure threshold, and/or if the number of failed call handovers exceeds a predetermined handover failure threshold.

Accordingly, at decision block 1014, if the analytic application determines that the number of subscribers whose data usage negatively affected performance of the congested network cell at the geolocation exceeds the threshold ("yes" at decision block 1014), the process 1000 may proceed to block 1016. At block 1016, the analytic application may provide a recommendation of no deployment of small network cells at the geolocation. This is because the congestion at the network cell is due to excess data usage by subscribers rather than a true lack of network capacity at the geolocation. Instead, the subscribers with the excess data usage may receive notices to reduce their data usage or they may be banned from using the wireless carrier network. The analytic application may provide the recommendation for viewing via an application user interface.

However, if the analytic application determines that the number of subscribers whose data usage negatively affected performance of the congested network cell at the geolocation does not exceed the threshold ("no" at decision block 1014), the process 1000 may proceed to block 1018. At block 1018, the analytic application may provide a recommendation to deploy one or more small network cells at the geolocation. This is because the congestion at the network cell is considered to be due to a true lack of network capacity at the geolocation and not excess data usage by subscribers. The analytic application may provide the recommendation for viewing via an application user interface.

Figure 11:
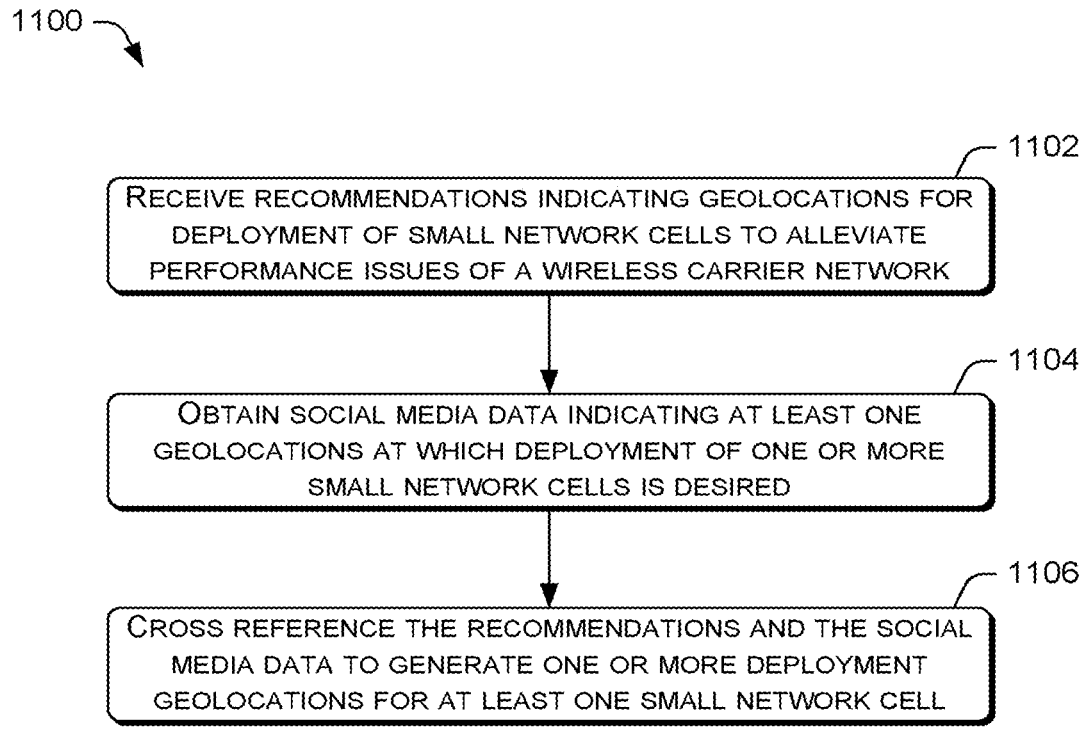
FIG. 11 is a flow diagram of an example process for generating automatic suggestions of new geolocations for the installation of small network cells within the wireless carrier network.

FIG. 11 is a flow diagram of an example process 1100 for generating automatic suggestions of new geolocations for the installation of small network cells within the wireless carrier network. At block 1102, the analytic application may receive recommendations of geolocations for the deployment of small network cells to alleviate performance issues of a wireless carrier network. In various embodiments, the recommendation may be generated by the analytic application or another analytic application based on performance data from the operation data source 110, the trouble ticket data source 112, and/or the alarm data source 114. For example, the recommendation may be generated based on OSS counters and data received from user devices regarding quality of service (i.e., call drops, one-way audio problems, etc.) at various geolocations. The small network cells may include microcells, femtocell, picocells, and/or so forth.

At block 1104, the analytic application may obtain social media data indicating at least one geolocation at which the deployment of one or more small network cells is desired. In various embodiments, the social media data may include social postings on blog web pages, message feed web pages, web forums, and/or electronic bulletin boards. The social postings may highlight network problems with the wireless carrier network as experienced by different subscribers at various geolocations.

At block 1106, the analytic application may cross reference the recommendations and the social media data to generate one or more deployment geolocation for at least one small network cell. For example, a deployment geolocation may be a location that appears both in the recommendation and a predetermined number of social postings. In another example, a deployment geolocation may be a location that appears both in the recommendation and social postings from a predetermined number of social media users. In an additional example, a deployment geolocation may be a location that appears in the recommendation and a predetermined number of social postings of a predetermined number of social media users. The analytic application may provide the at least one geolocation for viewing via an application user interface.

Figure 12:
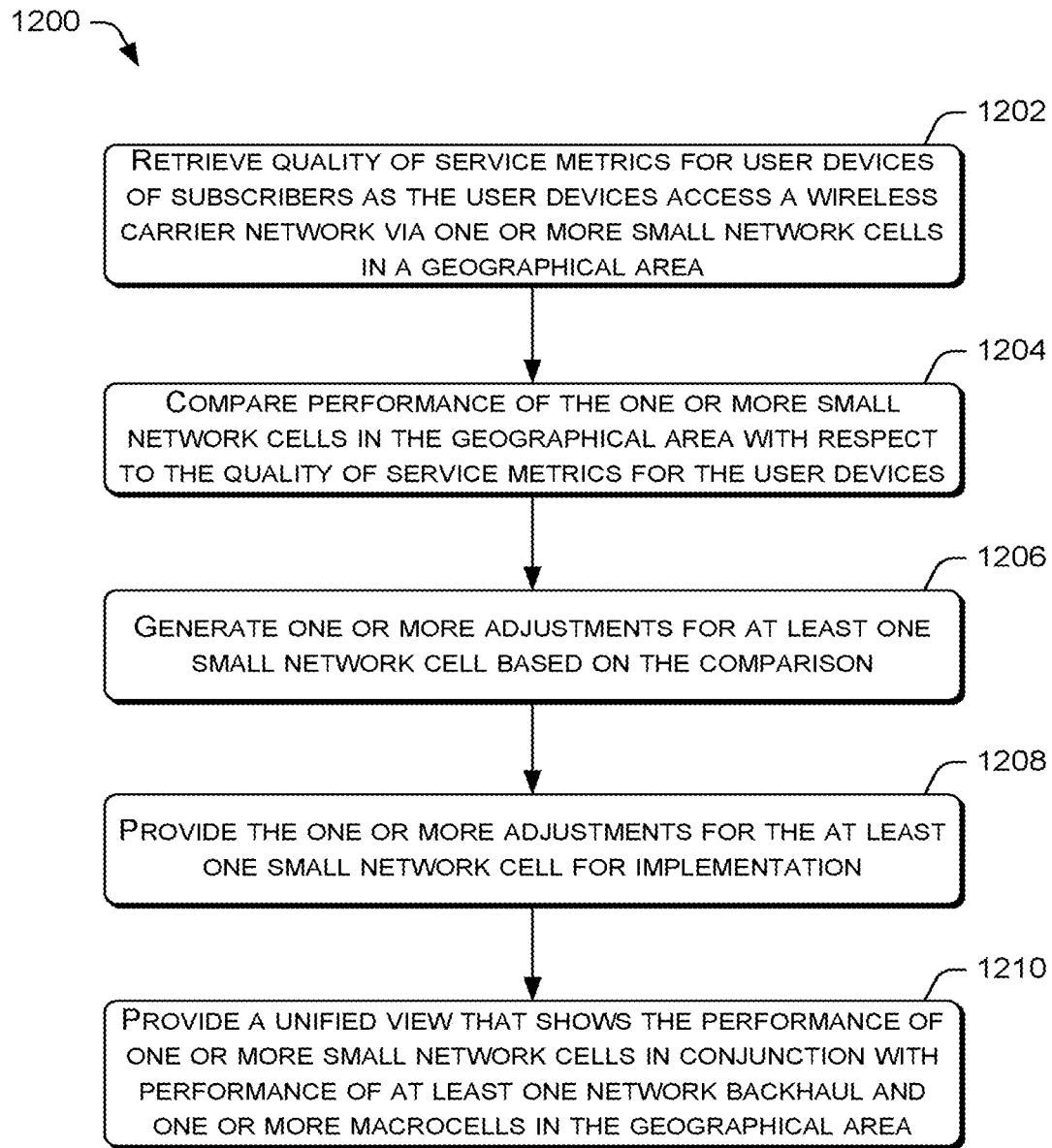
FIG. 12 is a flow diagram of an example process for tracking the performance of network devices in relation to small network cells, macro cells, and backhauls of the wireless carrier network.

FIG. 12 is a flow diagram of an example process 1200 for tracking the performance of network devices in relation to small network cells, macro cells, and backhauls of the wireless carrier network. At block 1202, an analytic application may retrieve quality of service metrics for user devices of subscribers as the user devices access a wireless carrier network via one or more small network cells in a geographical area. In various embodiments, the quality of service metrics may include call establishment delays, MOS of call audio quality, records of one-way audio problems, records of call drops, and/or so forth.

At block 1204, the analytic application may compare the performance of one or more small network cells in the geographical area with respect to the quality of service metrics for the user devices. In various embodiments, a small network cell may be a microcell, a femtocell, or a picocell. The performance of a small network cell may include an available bandwidth of the network cell, a signal coverage area of the cell, a data throughput of the network cell, average up time of the network cell, and/or so forth during a time interval.

At block 1206, the analytic application may generate one or more adjustments for at least one small network cell based on the comparison. The adjustments may include moving the small network cell to a different location, reorient an antenna of the small network cell in a different direction to reshape a cell coverage area, modifying the data throughput of the communication between the small network cell and a macrocell, updating the device software of the small network cell, and/or so forth. Accordingly, the adjustments may improve the quality of service provided to the subscribers.

At block 1208, the analytic application may provide the one or more adjustments for the at least one small network cell for implementation. In various embodiments, the one or more adjustments may be presented by the analytic application to a user via an application user interface. In turn, the user may reconfigure the one or more small network cells based on the presented information.

At block 1210, the analytic application may provide a unified view that shows the performance of one or more small network cells in conjunction with performance of at least one network backhaul and one or more macrocells in the geographical area. The unified view may display a comprehensive look at the performance of the wireless carrier network in the geographical area, such that a user may examine the integration of the network components in the area. The analytic application may provide the unified view via an application user interface.

Figure 13:
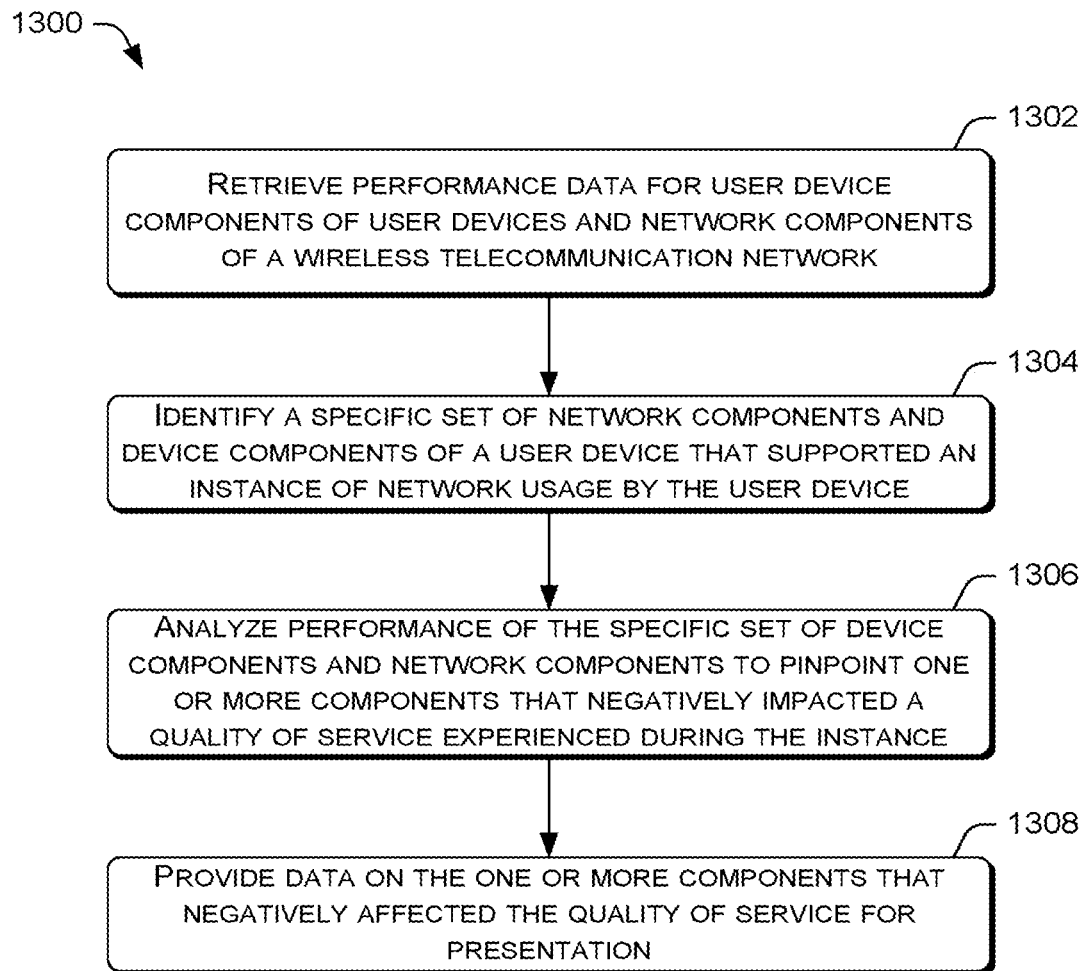
FIG. 13 is a flow diagram of an example process for generating an end-to-end look at the performance of device components of a user device and network components of a wireless carrier network in order to resolve a quality of service issue for a subscriber.

FIG. 13 is a flow diagram of an example process 1300 for generating an end-to-end look at the performance of device components of a user device and network components of a wireless carrier network in order to resolve a quality of service issue for a subscriber. At block 1302, an analytic application may retrieve performance data for user device components of user devices and network components of a wireless carrier network from a data store on the computing nodes 108. The performance data may be obtained by the data management platform 102 from multiple data sources, such as the data sources 110-118. The user device components may include device applications (e.g. a telephony application), device hardware (e.g., a radio transceiver), and/or so forth. The network components of the wireless carrier network may include network cells, RAN elements, backhauls, core network elements (e.g., gateway servers, Policy and Charging Rule Functions (PCRFs), IP multimedia subsystem (IMS) core, etc.), and Internet servers (e.g., application servers, multimedia servers, etc.)).

At block 1304, the analytic application may identify a specific set of network components and device components of a user device that supported an instance of network usage by the user device. The instance of network usage may be a VoIP call, a VoWiFi call, a Video over LTE call, a streaming of multimedia, or another type of data communication that is initiated or received by the user device. The analytic application may identify the components in response to a complaint report initiated by a user regarding the instance of network usage.

At block 1306, the analytic application may analyze the performance of the specific set of device components and network components to input one or more components that negatively impacted a quality of service experienced by the user during the instance. For example, a component may be determined to have negatively impacted the quality of service when a performance metric of the component is below a predetermined performance threshold. In another example, the component may be determined to have negatively impacted the quality of service when the component is a bottleneck that is responsible for the biggest delay experienced by the user during the usage instance. In an additional example, the component may be determined to have negatively impacted the quality of service when the component experienced a rate of error that is higher than a maximum error threshold.

At block 1308, the analytic application may provide data on the one or more components that negatively affected the quality of service for presentation. The presentation of such data may enable a user to initiate remediation measures to correct the problem with the one or more components. In various embodiments, the analytic application may provide the data on the one or more components via an application user interface.

Figure 14:
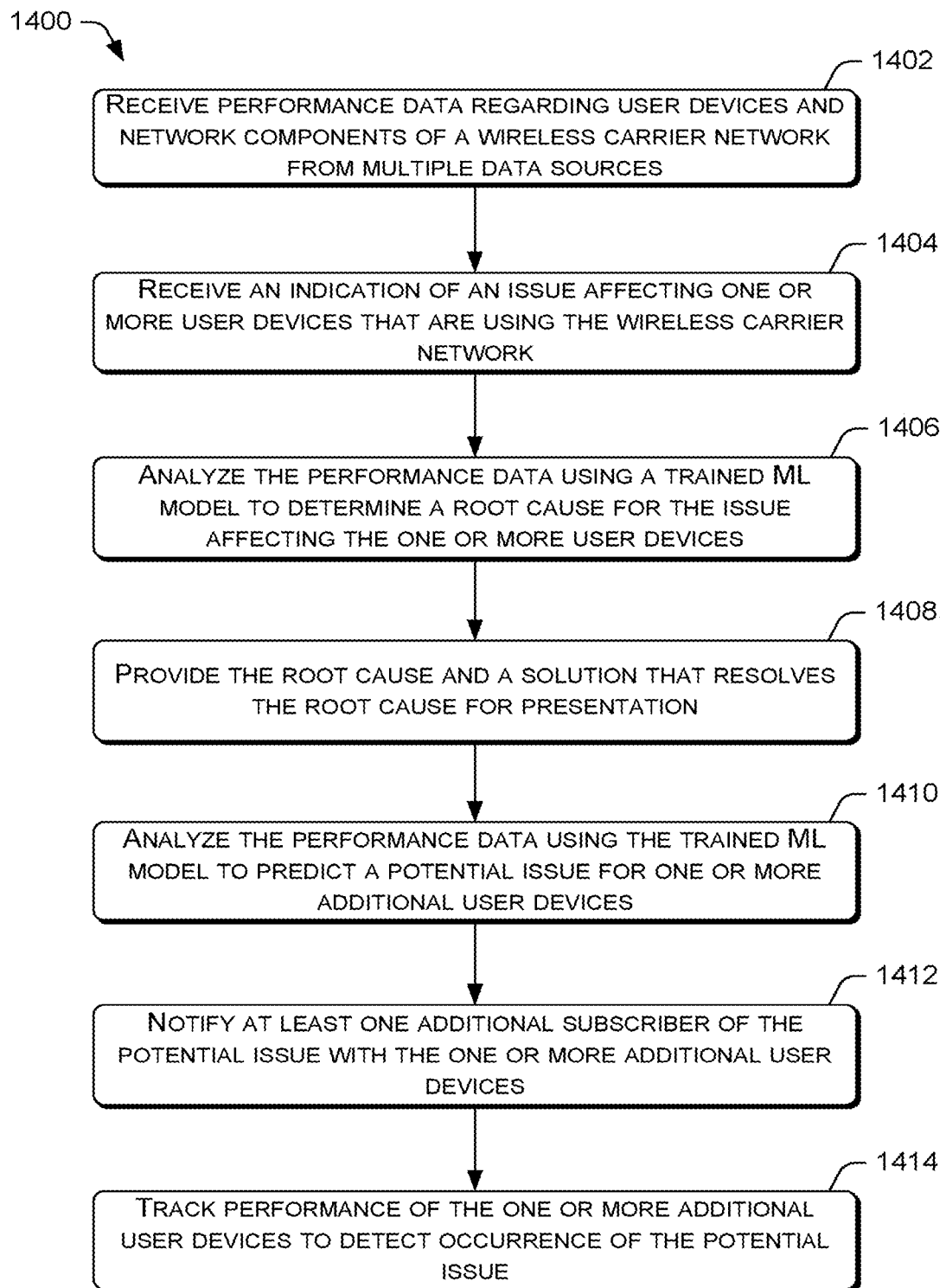
FIG. 14 is a flow diagram of an example process for using a trained machine learning model to automatically resolve trouble tickets for a wireless carrier network.

FIG. 14 is a flow diagram of an example process 1400 for using a trained machine learning model to automatically resolve trouble tickets for a wireless carrier network. At block 1402, the data management platform 102 may receive performance data regarding user devices and network components of a wireless carrier network from multiple sources. The performance data may include data that are collected from the data sources 110-118. For example, the performance data may include operation data, trouble ticket data, alarm data, social media data, and/or so forth. The performance data may measure the performance of one or more network components of the wireless carrier network and/or one or more device components of user devices that use the network. In various embodiments, the performance data may be visualized according to specific subscribers, specific geolocations, specific geographical areas, specific network cells, and/or so forth.

At block 1404, an analytic application may receive an indication of an issue affecting one or more user devices that are using the wireless carrier network. In various embodiments, the indication may be a trouble ticket that is initiated by a subscriber or automatically initiated by a network monitoring application. The issue may impact that quality of service that is received by the subscribers of the one or more user devices as the subscribers make voice calls, multimedia calls, upload data, and/or download data using the wireless carrier network.

At block 1406, the analytic application may analyze the performance data using a trained machine learning model to determine a root cause for the issue affecting the one or more user devices. In various embodiments, the performance data that is analyzed may be real time or non-real time data for a particular time interval. Further, the performance data may include aggregated or converged data. The trained machine learning model may employ multiple machine learning algorithms to analyze the performance data. For example, in some instances, the analytic application may track the geolocations of a subscriber as the subscriber roams between the geolocations during a particular time interval. Subsequently, the analytic application may analyze the performance data that are related to these geolocations using the trained machine learning model to ascertain the root cause. In other instances, the analytic application may analyze the performance of various network cells to generate a list of one or more top offender cells that contribute to the issue.

At block 1408, the analytic application may provide the root cause and a solution that resolves the root cause for presentation. In various embodiments, the analytic application may retrieve the solution from a solutions database. The analytic application may provide information on the root cause and the solution for viewing via an application user interface. The information on the root cause and/or the solution to the root cause may be visualized with reference to specific subscribers, specific user devices, specific geolocations, specific geographical areas, specific network cells, and/or so forth.

At block 1410, the analytic application may analyze the performance data using the trained machine learning model to predict a potential issue for one or more additional user devices that use the wireless carrier network. For example, the analysis of the performance data may indicate that a potential issue existing for a specific type of user devices due to hardware or software component similarity of the specific type to user devices that are found to be experiencing a particular issue. In another example, the analysis of the performance data may indicate that a common problem (e.g., a software security vulnerability) experienced by a specific group of user devices is likely to lead to another issue (e.g., unresponsive user device) if the common problem is not fixed in a timely fashion.

At block 1412, the analytic application may notify at least one additional subscriber of the potential issue with one or more additional user devices. In some embodiments, the analytic application may perform the notification by displaying an alert on an application user interface to a user that is a network engineer, such that the network engineering may notify the subscribers. In other embodiments, the analytic application may automatically send alert messages directly to the subscribers using the contact information of the subscribers. The alert message may include information that enables the subscribers to take preventative measures to stop the potential issue from occurring.

At block 1414, the analytic application may track the performance of the one or more additional user devices to detect occurrence of the potential issue on at least one additional user device. If the analytic application detects that the potential issue actually occurred, the analytic application may directly take remediation action or cause another application component of the wireless carrier network to take remediation action. The remediation action may include sending another alert message to a subscriber that is using an additional user device, informing a network engineer to contact the subscriber in order to resolve the issue, automatically terminating service to the additional user device until the issue is resolved, automatically pushing a software update to the additional user device to fix the issue, and/or so forth.

The comprehensive analysis of user device performance data and network performance data of a wireless carrier network on a granular level may enable the discovery of root causes of quality of service issues that are invisible to conventional data analysis techniques. Accordingly, such analysis may pinpoint the root cause of a quality of service issue to a specific device or network component. Further, the use of a machine learning model during the analysis may enable the automatic resolution of customer complaints. Such automatic resolution may reduce issue resolution time while increase issue resolution rate.

Embodiments use a machine learning model to make decisions. In some embodiments, the machine learning model may be operated in an open loop fashion. In some embodiments, the machine learning model may be operated in a closed loop fashion.

When operated in Open Loop, an operator reviews the results generated by the machine learning model and indicates CORRECT or INCORRECT. This operator feedback may be used to retrain the machine learning model. Retraining could be done automatically.

When operated in Open Loop, the system automatically assigns the decision made by the machine learning model and implements the corresponding action.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media (CRM) storing computer-executable instructions that upon execution cause one or more processors of an analysis system to perform acts comprising:
   receiving, by the analysis system, data regarding user devices and network components of a wireless carrier network from multiple data sources;
   receiving, by the analysis system, an indication of an issue affecting one or more user devices that are using the wireless carrier network, the issue impacting a quality of service experienced by at least one user of the one or more user devices as the one or more user devices are used to make voice calls, make multimedia calls, upload data, or download data using the wireless carrier network;
   performing, by the analysis system, an analysis of the data in response to receiving the indication of the issue, wherein performing the analysis includes analyzing the data using a trained machine learning model to determine a root cause for the issue affecting the one or more user devices, the trained machine learning model employing multiple types of machine learning algorithms to analyze the data; and
   providing, by the analysis system and based on the analysis, at least one of the root cause and a solution that resolves the root cause for presentation,
   wherein the data regarding the user devices and network components includes performance information, network topology information, network expansion/modification information, network coverage information, planned maintenance information, alarm information, or combinations thereof.

2. The CRM of claim 1, wherein receiving the indication of the issue includes receiving the indication of the issue in a trouble ticket automatically generated by software agents that monitor the health and performance of the wireless carrier network, by analysis of customer interaction with a chatbot, by analysis of customer interaction on a social media service, or combinations thereof.

3. The CRM of claim 1, wherein the acts comprise:
   performing, by the analysis system, the analysis of the data in response to a change in a plan a subscriber is enrolled in, a change in a device the subscriber is using, or performance degradation specific to the subscriber.

4. The CRM of claim 1, wherein receiving the indication of the issue includes receiving the indication of the issue in a trouble ticket; and
  wherein performing the analysis of the data includes using case-based reasoning to resolve the trouble tickets based on historical resolutions of the one or more previously received trouble tickets.

5. The CRM of claim 1, wherein receiving the indication of the issue includes receiving the indication of the issue in a trouble ticket; and
  wherein performing the analysis of the data includes grouping the trouble ticket with previously received trouble tickets into a master trouble ticket when the trouble ticket and the previously received trouble tickets have a common originating cause.

6. The CRM of claim 5, wherein grouping the trouble tickets with previously received trouble tickets into a master trouble ticket is performed using clustering techniques to facilitate labeling into root cause categories.

7. The CRM of claim 1, wherein receiving the indication of the issue includes receiving the indication of the issue in a trouble ticket; and
  wherein the acts comprise:
    detecting whether a result of the analysis of the data performed in response to the indication including the trouble ticket corresponds to an anomalous trend relative to results of previous analyses respectively performed in response to the previously received trouble tickets; and
    altering a mode of operation of the analysis system in response to detecting the anomalous trend.

8. The CRM of claim 1, wherein receiving the indication of the issue includes receiving the indication of the issue in a trouble ticket; and
  wherein the analysis of the data includes using natural language processing to detect, in the trouble ticket, any of a plurality of keywords, any of a plurality of terms having meaning similar to any of the plurality of keywords, or both.

9. The CRM of claim 7, wherein the analysis of the data includes determining a severity of an issue reported in the trouble ticket using a result of the natural language processing.

10. The CRM of claim 1, wherein the analysis of the data uses provisioning data, the provisioning data including a type of a subscription of the user, an allowed speed of the user, an allowed service of the user, or combinations thereof.

11. The CRM of claim 1, wherein analyzing the data includes
  providing a result generated by the machine learning model to an operator,
  receiving an indication from the operator of whether the result is correct or incorrect; and
  retraining the machine learning model according to the indication received from an operator.

12. The CRM of claim 1, wherein receiving the data includes receiving some or all of the data from a Networks Automation Center (NOC) automation system.

13. The CRM of claim 1, wherein receiving the data includes receiving some or all of the data from an automated customer care system.

14. The CRM of claim 1, wherein the acts comprise:
  providing a result produced by analyzing the data to an automated system that produces an optimization recommendation, a troubleshooting recommendation, a network level action, or combinations thereof for the wireless carrier network.

15. A method of analyzing a wireless carrier network, the method comprising:
  receiving data regarding user devices and network components of the wireless carrier network from multiple data sources;
  receiving an indication of an issue affecting one or more user devices that are using the wireless carrier network, the issue impacting a quality of service experienced by at least one user of the one or more user devices as the one or more user devices are used to make voice calls, make multimedia calls, upload data, or download data using the wireless carrier network;
  analyzing the data in response to receiving the indication of the issue; and
  providing a root cause, a solution that resolves the root cause, or both for presentation,
  wherein analyzing the data includes using a trained machine learning model to determine a root cause for the issue, the trained machine learning model employing multiple types of machine learning algorithms to analyze the data,
  wherein the data regarding the user devices and network components includes performance information, network topology information, network expansion/modification information, network coverage information, planned maintenance information, alarm information, or combinations thereof.

16. The method of claim 15, wherein receiving the indication of the issue includes receiving the indication of the issue in a trouble ticket automatically generated by software agents that monitor the health and performance of the wireless carrier network, by analysis of customer interaction with a chatbot, by analysis of customer interaction on a social media service, or combinations thereof.

17. The method of claim 15, comprising:
  analyzing the data in response to a change in a plan a subscriber is enrolled in, a change in a device the subscriber is using, or performance degradation specific to the subscriber.

18. The method of claim 15, wherein receiving the indication of the issue includes receiving the indication of the issue in a trouble ticket; and
  wherein analyzing the data includes using case-based reasoning to resolve the trouble tickets based on historical resolutions of the one or more previously received trouble tickets; grouping the trouble ticket with previously received trouble tickets into a master trouble ticket when the trouble ticket and the previously received trouble tickets have a common originating cause, using natural language processing to detect, in the trouble ticket, any of a plurality of keywords, any of a plurality of terms having meaning similar to any of the plurality of keywords, or both; or combinations thereof.

19. The method of claim 15, wherein analyzing the data is performed using provisioning data, the provisioning data including a type of a subscription of the user, an allowed speed of the user, an allowed service of the user, or combinations thereof.

20. The method of claim 15, wherein analyzing the data includes:
  providing a result generated by the machine learning model to an operator,
  receiving an indication from the operator of whether the result is correct or incorrect; and retraining the machine learning model according to the indication received from an operator.

* * * * *